United States Patent
Kanno et al.

(10) Patent No.: US 10,443,521 B2
(45) Date of Patent: Oct. 15, 2019

(54) EXHAUST EMISSION CONTROL SYSTEM OF ENGINE

(71) Applicant: Mazda Motor Corporation, Aki-gun, Hiroshima (JP)

(72) Inventors: Masonobu Kanno, Hiroshima (JP); Hiroyuki Nishimura, Higashihiroshima (JP); Kenji Tanimura, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 232 days.

(21) Appl. No.: 15/638,719

(22) Filed: Jun. 30, 2017

(65) Prior Publication Data

US 2018/0017002 A1   Jan. 18, 2018

(30) Foreign Application Priority Data

Jul. 12, 2016   (JP) ................... 2016-137853

(51) Int. Cl.
*F02D 41/02* (2006.01)
*F02M 26/25* (2016.01)
(Continued)

(52) U.S. Cl.
CPC ..... *F02D 41/0275* (2013.01); *B01D 53/9477* (2013.01); *B01D 53/9495* (2013.01);
(Continued)

(58) Field of Classification Search
CPC .......... F02D 41/02; F02D 41/40; F02D 41/00; F02D 41/10; F02D 41/0275;
(Continued)

(56) References Cited

U.S. PATENT DOCUMENTS

2002/0073696 A1* 6/2002 Kuenstler ............... F01N 3/023
60/295
2008/0314036 A1* 12/2008 Yokoyama ............ F01N 3/021
60/303
(Continued)

FOREIGN PATENT DOCUMENTS

JP         H1150884 A      2/1999
JP      2001234772 A  *  8/2001
(Continued)

OTHER PUBLICATIONS

JP 2010-31703, Machine Translation, Translated on Apr. 16, 2019.*

*Primary Examiner* — Patrick D Maines
(74) *Attorney, Agent, or Firm* — Alleman Hall Creasman & Tuttle LLP

(57) ABSTRACT

An exhaust emission control system of an engine is provided, which includes a $NO_x$ catalyst disposed in an exhaust passage for storing $NO_x$ within exhaust gas when an air-fuel ratio of the exhaust gas is lean, and reducing the stored $NO_x$ when the air-fuel ratio is approximately stoichiometric or rich. A processor executes a $NO_x$ reduction controlling module for performing a $NO_x$ reduction control in which a fuel injector performs a post injection to control the air-fuel ratio to a target ratio, and an EGR controlling module for controlling an EGR valve to recirculate EGR gas. In the $NO_x$ reduction control, the EGR controlling module controls an opening of the EGR valve to a target opening smaller than when the $NO_x$ reduction control is not performed. The $NO_x$ reduction controlling module starts the control after the EGR valve opening is controlled to the target opening.

7 Claims, 11 Drawing Sheets

(51) Int. Cl.
*B01D 53/94* (2006.01)
*F01N 3/08* (2006.01)
*F02D 41/00* (2006.01)
*F02D 41/10* (2006.01)
*F02D 41/40* (2006.01)
*F02D 41/14* (2006.01)
*F01N 9/00* (2006.01)

(52) U.S. Cl.
CPC ......... *F01N 3/0814* (2013.01); *F01N 3/0842* (2013.01); *F01N 3/0871* (2013.01); *F01N 9/00* (2013.01); *F02D 41/0055* (2013.01); *F02D 41/0077* (2013.01); *F02D 41/10* (2013.01); *F02D 41/1454* (2013.01); *F02D 41/1461* (2013.01); *F02D 41/405* (2013.01); *F02M 26/25* (2016.02); *B01D 53/9418* (2013.01); *B01D 53/9422* (2013.01); *B01D 53/9436* (2013.01); *F01N 2570/14* (2013.01); *F01N 2900/1614* (2013.01); *F02D 2200/0802* (2013.01); *F02D 2200/0806* (2013.01); *F02D 2200/602* (2013.01); *F02D 2250/36* (2013.01); *Y02A 50/2344* (2018.01); *Y02T 10/24* (2013.01); *Y02T 10/44* (2013.01); *Y02T 10/47* (2013.01)

(58) Field of Classification Search
CPC .... F02D 41/0077; F02D 41/0055; F01N 3/08; B01D 53/94; B01D 53/9422
See application file for complete search history.

(56) References Cited

U.S. PATENT DOCUMENTS

2010/0018187 A1* 1/2010 Matsumoto ........... F01N 3/0814
60/286
2011/0061363 A1* 3/2011 Levijoki ................. F01N 3/208
60/273

FOREIGN PATENT DOCUMENTS

| | | | |
|---|---|---|---|
| JP | 2004360593 A | | 12/2004 |
| JP | 2007051605 A | | 3/2007 |
| JP | 2010031703 A | * | 2/2010 |
| JP | 2010031703 A | | 2/2010 |
| JP | 2010084615 A | | 4/2010 |
| JP | 2014148962 A | | 8/2014 |
| JP | 2015068274 A | | 4/2015 |

* cited by examiner

//EXHAUST EMISSION CONTROL SYSTEM OF ENGINE

BACKGROUND

The present invention relates to an exhaust emission control system of an engine, and particularly to an exhaust emission control system which is provided on an exhaust passage with a $NO_x$ catalyst for purifying $NO_x$ in exhaust gas.

Conventionally, $NO_x$ storage catalysts which store (occlude) $NO_x$ contained in exhaust gas when an air-fuel ratio of the exhaust gas is lean (i.e., $\lambda > 1$, larger than a theoretical air-fuel ratio) are known. Such $NO_x$ storage-reduction catalysts further reduce the stored $NO_x$ when the air-fuel ratio is approximately equal to stoichiometric (i.e., $\lambda \approx 1$, approximately equal to the theoretical air-fuel ratio) or is rich (i.e., $\lambda < 1$, smaller than the theoretical air-fuel ratio). Within a normal operating range of an engine, the engine is operated at the lean air-fuel ratio ($\lambda > 1$) so as to reduce fuel consumption, although if this lean operation state continues for a while, the $NO_x$ stored amount in the $NO_x$ catalyst reaches a limit value and the $NO_x$ catalyst can no longer store $NO_x$, which causes $NO_x$ to be released. For this reason, the air-fuel ratio is suitably set to be stoichiometric or richer ($\lambda \leq 1$) in order to reduce $NO_x$ stored in the $NO_x$ catalyst. Note that "$\lambda$" is an index of the air-fuel ratio expressed with reference to the theoretical air-fuel ratio, and is a so-called air excess ratio.

For example, JP2004-360593A discloses an art for executing, when a $NO_x$ stored amount in a $NO_x$ catalyst exceeds a given amount, a fuel injection control to enrich an air-fuel ratio of exhaust gas so as to reduce the $NO_x$ stored in the $NO_x$ catalyst.

One example of a setting method of an air-fuel ratio of exhaust gas so that $NO_x$ stored in a $NO_x$ catalyst becomes reducible (hereinafter, this air-fuel ratio is referred to as "target air-fuel ratio") is performing a post injection after a main injection. In the main injection, fuel is injected into a cylinder so as to output a desirable engine torque, and in the post injection, fuel is injected at a timing so that the engine torque output is not influenced (typically, on expansion stroke). The fuel injected in the post injection typically needs to be combusted inside the cylinder in order to perform the reduction of the $NO_x$ catalyst, otherwise unburned fuel is discharged and degrades emission performance of HC (hydrocarbon), etc.

In this regard, JP2004-360593A suggests that when reducing $NO_x$ stored in the $NO_x$ catalyst, an exhaust gas recirculation (EGR) gas amount recirculated back to an intake system is increased and a fresh air amount introduced into the engine is reduced so as to enrich the air-fuel ratio of the exhaust gas. However, increasing the EGR gas amount in the configuration for performing the post injection and combusting the fuel injected in the post injection inside the cylinder during the reduction of the $NO_x$ catalyst as described above, may degrade combustion stability and the fuel injected in the post injection may not properly be combusted inside the cylinder. In this case, HC which is unburned fuel is generated.

Although the introduction of EGR gas during the reduction of the $NO_x$ catalyst may be prohibited to prevent such HC generation, this makes it impossible to suitably control an oxygen concentration within the cylinder, and smoke (soot) may be generated when the fuel injected in the post injection is combusted inside the cylinder.

SUMMARY

The present invention is made in view of solving the issues of the conventional arts described above, and aims to suitably control an EGR gas amount when a $NO_x$ reduction control, in which a post injection is performed to achieve a target air-fuel ratio at which $NO_x$ stored in a $NO_x$ catalyst is reducible, is executed by an exhaust emission control system.

According to one aspect of the present invention, an exhaust emission control system of an engine is provided, which includes a $NO_x$ catalyst disposed in an exhaust passage of the engine and for storing $NO_x$ within exhaust gas when an air-fuel ratio of the exhaust gas is lean, and reducing the stored $NO_x$ when the air-fuel ratio is approximately stoichiometric or rich. The system comprises a processor configured to execute a $NO_x$ reduction controlling module for performing a $NO_x$ reduction control in which a fuel injector performs a post injection of fuel to control the air-fuel ratio to a target air-fuel ratio so that the stored $NO_x$ is reduced, the target air-fuel ratio being a ratio at which the stored $NO_x$ is reducible, and an EGR controlling module for controlling an EGR valve disposed in an EGR passage connected to the exhaust passage and an intake passage of the engine, to recirculate EGR gas from the exhaust passage to the intake passage at a flow rate according to an operating state of the engine. When the $NO_x$ reduction controlling module performs the $NO_x$ reduction control, the EGR controlling module controls an opening of the EGR valve to a target opening smaller than the opening when the $NO_x$ reduction controlling module does not perform the $NO_x$ reduction control in the same operating state of the engine. The $NO_x$ reduction controlling module starts the $NO_x$ reduction control after the opening of the EGR valve is controlled to the target opening.

With this configuration, under the same operating state of the engine, the target opening of the EGR valve is controlled to be smaller, i.e., an amount of the EGR gas to be recirculated to an intake system is controlled to be smaller, when the $NO_x$ reduction control is performed than when it is not performed. Then the $NO_x$ reduction control is started after the control of the EGR valve to be set to the target opening. Thus, it is possible to introduce a suitable amount of EGR gas during the $NO_x$ reduction control. As a result, generation of smoke and HC due to combusting the fuel in the post injection in the $NO_x$ reduced control is suitably reduced.

The $NO_x$ reduction controlling module may start the $NO_x$ reduction control after the opening of the EGR valve is controlled to the target opening and EGR gas is supplied into the engine at a flow rate corresponding to the target opening.

With this configuration, since the $NO_x$ reduction control is started after the desired amount of the EGR gas is determined to be supplied, i.e., once the control of the EGR valve by the EGR controlling module is stabilized, the generation of smoke and HC is reliably reduced.

The $NO_x$ reduction controlling module may estimate an in-cylinder oxygen concentration based on an operating state of the engine, determine that the EGR gas is supplied into the engine at the flow rate corresponding to the target opening when a difference between the estimated in-cylinder oxygen concentration and a target in-cylinder oxygen concentration for the $NO_x$ reduction control falls below a given value, and start the $NO_x$ reduction control.

With this configuration, a stable state of the EGR gas amount is suitably detected based on the difference between the estimated in-cylinder oxygen concentration and the target in-cylinder oxygen concentration for the $NO_x$ reduction control.

The EGR controlling module may set the target opening based on a target in-cylinder oxygen concentration for the $NO_x$ reduction control.

With this configuration, since the opening of the EGR valve is controlled based on the target in-cylinder oxygen concentration for the $NO_x$ reduction control, the inside of the cylinder of the engine is suitably set at the desired oxygen concentration by introducing a desired amount of EGR gas into the engine.

The EGR passage may include a first EGR passage on which an EGR cooler is disposed, and a second EGR passage for flowing the EGR gas by bypassing the EGR cooler. The EGR valve may include a first EGR valve for adjusting the flow rate of the EGR gas flowing in the first EGR passage, and a second EGR valve for adjusting the flow rate of the EGR gas flowing in the second EGR passage. When the $NO_x$ reduction controlling module executes the $NO_x$ reduction control, the EGR controlling module may fully close the first EGR valve and set the opening of the second EGR valve to the target opening so as to recirculate the EGR gas by only passing through the second EGR passage.

With this configuration, since the EGR gas is recirculated without passing through the EGR cooler, i.e., bypassing the EGR cooler, during the $NO_x$ reduction control, HC, etc. generated due to the post injection is prevented from being taken in as the EGR gas and cooled by the EGR cooler to cause a deposit to block the EGR cooler.

When the $NO_x$ stored amount in the $NO_x$ catalyst exceeds a given determination amount, the $NO_x$ reduction controlling module may perform, as the $NO_x$ reduction control, a first $NO_x$ reduction control in which the fuel injector performs the post injection to continuously control the air-fuel ratio to the target air-fuel ratio so that the stored $NO_x$ is reduced and the $NO_x$ stored amount falls below a given amount, the post injection being performed at a timing so that the injected fuel is combusted inside a cylinder of the engine.

In this configuration, the first $NO_x$ reduction control in which the fuel in the post injection combusted inside the cylinder so as to set the air-fuel ratio to the target air-fuel ratio is executed. Accordingly, by introducing a suitable amount of the EGR gas in the first $NO_x$ reduction control, combustion stability is prevented from degrading due to the introduction of a large amount of EGR gas, i.e., the combustion stability is secured, the post-injected fuel is properly combusted, and generation of HC corresponding to unburned fuel is reduced. Further, by introducing the suitable amount of EGR gas in the first $NO_x$ reduction control, ignition of the fuel of the post injection is delayed to cause ignition in a state where air and fuel are suitably mixed, and generation of smoke due to combustion of the fuel of the post injection is reduced.

When the $NO_x$ stored amount in the $NO_x$ catalyst is below the determination amount and the air-fuel ratio becomes rich due to acceleration of a vehicle, the $NO_x$ reduction controlling module may also execute a second $NO_x$ reduction control in which the fuel injector performs the post injection so as to temporarily control the air-fuel ratio to the target air-fuel ratio, so that the $NO_x$ stored in the $NO_x$ catalyst is reduced, the post injection being performed at a timing so that the injected fuel is discharged as unburned fuel without being combusted inside the cylinder. When the $NO_x$ reduction controlling module performs the second $NO_x$ reduction control, the EGR controlling module may limit the recirculation of EGR gas to be less than when the $NO_x$ reduction controlling module executes the first $NO_x$ reduction control.

In this configuration, in addition to the first $NO_x$ reduction control described above, the second $NO_x$ reduction control in which the fuel in the post injection is discharged as unburned fuel without being combusted inside the cylinder so as to set the air-fuel ratio to the target air-fuel ratio is executed. Accordingly, in the second $NO_x$ reduction control, since the recirculation of EGR gas to the intake system is limited compared to the first $NO_x$ reduction control, unburned fuel discharged in the second $NO_x$ reduction control is prevented from mixing with the EGR gas and recirculating to cause deposits produced thereby to block the gas passage.

The EGR controlling module may prohibit the recirculation of EGR gas when the $NO_x$ reduction controlling module performs the second $NO_x$ reduction control.

With this configuration, the gas passage is surely prevented from being blocked by the deposit due to the unburned fuel in the second $NO_x$ reduction control.

DETAILED DESCRIPTION OF EMBODIMENT

Hereinafter, an exhaust emission control system of an engine according to one embodiment of the present invention is described with reference to the accompanying drawings.

<System Configuration>

First, an engine system to which the exhaust emission control system of the engine of this embodiment is applied is described with reference to a schematic configuration view of the engine system in FIG. 1.

Figure 1:
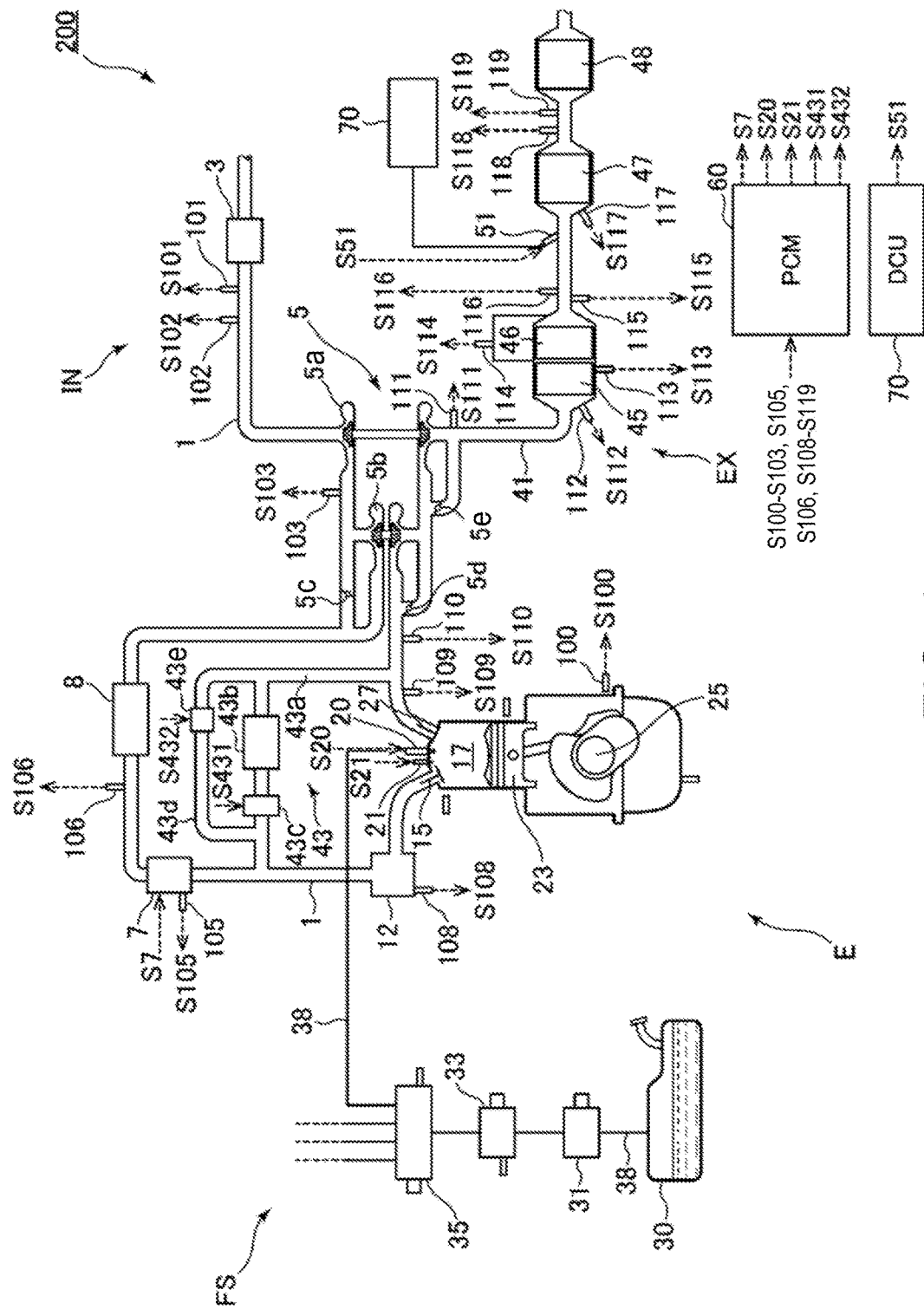
FIG. 1 is a view illustrating a schematic configuration of an engine system to which an exhaust emission control system of an engine according to one embodiment of the present invention is applied.

As illustrated in FIG. 1, an engine system 200 mainly includes a diesel engine as an engine E, an intake system IN for supplying intake air into the engine E, a fuel supply system FS for supplying fuel into the engine E, an exhaust system EX for discharging exhaust gas from the engine E, sensors 100 to 103, 105, 106, and 108 to 119 for detecting various states relating to the engine system 200, a PCM (Power-train Control Module; controller) 60 for controlling the engine system 200, and a DCU (Dosing Control Unit) 70 for executing a control relating to a selective catalytic reduction (SCR) catalyst 47.

First, the intake system IN includes an intake passage 1 through which intake air passes. In the intake passage 1, an air cleaner 3 for purifying air introduced from outside, a compressor of a turbocharger 5 for compressing intake air passing therethrough to increase pressure of the intake air, an intercooler 8 for cooling the intake air with outdoor air or coolant, an intake shutter valve 7 (corresponding to a throttle valve) for adjusting a flow rate of intake air passing therethrough, and a surge tank 12 for temporarily storing intake air to be supplied into the engine E are provided in this order from the upstream side.

Further in the intake system IN, an airflow sensor 101 for detecting an intake air amount and a temperature sensor 102 for detecting an intake air temperature are disposed in the intake passage 1 immediately downstream of the air cleaner 3. A pressure sensor 103 for detecting pressure of the intake air is provided to the turbocharger 5. A temperature sensor 106 for detecting an intake air temperature is disposed in the intake passage 1 immediately downstream of the intercooler 8. A position sensor 105 for detecting an opening of the intake shutter valve 7 is provided to the intake shutter valve 7. A pressure sensor 108 for detecting pressure of intake air in an intake manifold is provided to the surge tank 12. The various sensors 101 to 103, 105, 106 and 108 provided in the intake system IN output detection signals S101 to S103, S105, S106 and S108 corresponding to the detected parameters to the PCM 60, respectively.

Next, the engine E includes an intake valve 15 for introducing the intake air supplied from the intake passage 1 (more specifically, intake manifold) into a combustion chamber 17, a fuel injector 20 for injecting fuel to the combustion chamber 17, a glow plug 21 provided with a heat generating part 21a for generating heat when energized, a piston 23 that reciprocates due to combustion of air-fuel mixture within the combustion chamber 17, a crankshaft 25 that rotates due to the reciprocation of the piston 23, and an exhaust valve 27 for discharging the exhaust gas generated by the combustion of the air-fuel mixture within the combustion chamber 17 to an exhaust passage 41. The engine E is also provided with a crank angle sensor 100 for detecting a crank angle which is a rotational angle of the crankshaft 25 measured, for example, with reference to a top dead center. The crank angle sensor 100 outputs a detection signal S100 corresponding to the detected crank angle to the PCM 60 which acquires an engine speed based on the detection signal S100.

Here, the glow plug 21 of this embodiment is described in detail with reference to FIG. 2, which is a schematic top view of the combustion chamber 17 of the engine E of this embodiment. More specifically, FIG. 2 illustrates the placement of the glow plug 21 within the combustion chamber 17.

Figure 2:
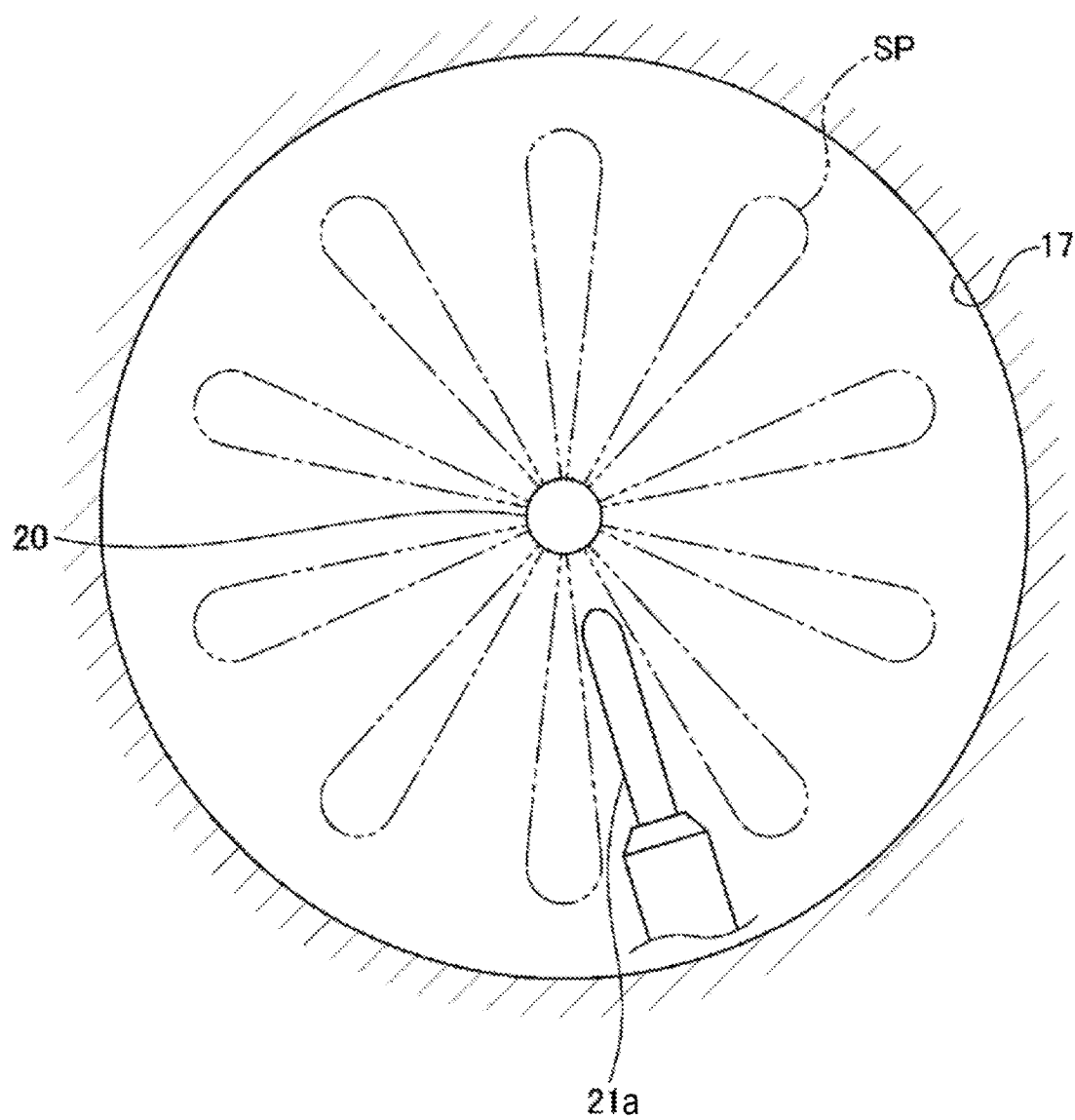
FIG. 2 is a schematic top view of a combustion chamber of the engine of the embodiment.

As illustrated in FIG. 2, the fuel injector 20 is formed with a plurality of nozzle ports in an injection surface, i.e., structured as a multi-hole type, and injects the fuel from these nozzle ports in a plurality of directions (two-dotted chain line areas assigned with the reference character SP show the fuel spray from each nozzle hole). The glow plug 21 is disposed such that the heat generating part 21a located within the combustion chamber 17 is positioned between the areas of fuel spray SP injected from the plurality of nozzle ports of the fuel injector 20. In other words, the heat generating part 21a of the glow plug 21 is disposed not to be in direct contact with the fuel spray SP. In this manner, an inconvenience (e.g., failure in the glow plug 21) caused by direct application of the fuel to the heat generating part 21a of the glow plug 21 is prevented. Typically, when the glow plug 21 is energized, the heat generating part 21a generates heat and combustion starts inside the cylinder using this heat as a heat source. By this combustion, pressure inside the cylinder (in-cylinder pressure) rises, thus the ignitability inside the entire cylinder is secured.

Returning to FIG. 1, the fuel supply system FS has a fuel tank 30 for storing the fuel and a fuel supply passage 38 for supplying the fuel from the fuel tank 30 to the fuel injector 20. In the fuel supply passage 38, a low-pressure fuel pump 31, a high-pressure fuel pump 33, and a common rail 35 are disposed in this order from the upstream.

Next, the exhaust system EX includes the exhaust passage 41 through which the exhaust gas passes. In the exhaust passage 41, a turbine of the turbocharger 5 which is rotated by the exhaust gas passing therethrough and drives the compressor by this rotation is disposed. Further the following components are disposed in the exhaust passage 41 on the downstream side of the turbine in the following order from the upstream: a $NO_x$ catalyst 45 for purifying $NO_x$ within the exhaust gas; a diesel particulate filter (DPF) 46 for capturing particulate matter (PM) within the exhaust gas; a urea injector 51 for injecting urea into the exhaust passage 41 downstream of the DPF 46; the SCR catalyst 47 for producing ammonia by hydrolysis of urea injected by the urea injector 51 and purifying $NO_x$ by causing a reaction (reduction) of this ammonia with $NO_x$ within the exhaust gas; and a slip catalyst 48 for oxidizing unreacted ammonia discharged from the SCR catalyst 47 to purify it. Note that the urea injector 51 is controlled to inject urea into the exhaust passage 41 based on a control signal S51 supplied from the DCU 70.

Here, the $NO_x$ catalyst 45 is described more in detail. The $NO_x$ catalyst 45 is a $NO_x$ storage catalyst (NSC) which stores $NO_x$ contained within the exhaust gas when an air-fuel ratio of the exhaust gas is lean (i.e., $\lambda > 1$, larger than a theoretical air-fuel ratio), and reduces the stored $NO_x$ when the air-fuel ratio is approximately equal to stoichiometric (i.e., $\lambda \approx 1$, approximately equal to the theoretical air-fuel ratio) or is rich (i.e., $\lambda < 1$, smaller than the theoretical air-fuel ratio). The $NO_x$ catalyst 45 functions, not only as the NSC, but also as a diesel oxidation catalyst (DOC) which oxidizes hydrocarbon (HC), carbon monoxide (CO), etc. using oxygen within the exhaust gas to convert them into water and carbon dioxide. For example, the $NO_x$ catalyst 45 is made by coating a surface of a catalyst material layer of DOC with a catalyst material of NSC.

Further in the exhaust system EX, a pressure sensor 109 for detecting pressure of the exhaust gas and a temperature sensor 110 for detecting an exhaust gas temperature are disposed in the exhaust passage 41 upstream of the turbine of the turbocharger 5. An $O_2$ sensor 111 for detecting an oxygen concentration within the exhaust gas is disposed in the exhaust passage 41 immediately downstream of the turbine of the turbocharger 5. Moreover, the exhaust system EX includes a temperature sensor 112 for detecting an exhaust gas temperature at a position immediately upstream of the $NO_x$ catalyst 45, a temperature sensor 113 for detecting an exhaust gas temperature at a position between the $NO_x$ catalyst 45 and the DPF 46, a pressure difference sensor 114 for detecting a pressure difference of exhaust gas between positions immediately upstream and downstream of the DPF 46, a temperature sensor 115 for detecting an exhaust gas temperature at a position immediately downstream of the DPF 46, a $NO_x$ sensor 116 for detecting a concentration of $NO_x$ within the exhaust gas at a position immediately downstream of the DPF 46, a temperature sensor 117 for detecting an exhaust gas temperature at a position immediately upstream of the SCR catalyst 47, a $NO_x$ sensor 118 for detecting a concentration of $NO_x$ within the exhaust gas at a position immediately downstream of the SCR catalyst 47, and a PM sensor 119 for detecting PM within the exhaust gas at a position immediately upstream of the slip catalyst 48. The various sensors 109 to 119 provided in the exhaust system EX output detection signals S109 to S119 corresponding to the detected parameters to the PCM 60, respectively.

In this embodiment, the turbocharger 5 is configured as a two-stage turbocharging system capable of efficiently obtaining high turbocharging performance in all low to high engine speed ranges. The exhaust energy is low within the low engine speed range. That is, the turbocharger 5 includes a large turbocharger 5a for turbocharging a large amount of air within a high engine speed range, a small turbocharger 5b capable of performing efficient turbocharging even with low exhaust energy, a compressor bypass valve 5c for controlling the flow of intake air to a compressor of the small turbocharger 5b, a regulator valve 5d for controlling the flow of exhaust gas to a turbine of the small turbocharger 5b, and a wastegate valve 5e for controlling the flow of exhaust gas to a turbine of the large turbocharger 5a. By driving each valve in accordance with the operating state of the engine E (engine speed and load), the operated turbocharger is switched between the large turbocharger 5a and the small turbocharger 5b.

The engine system 200 of this embodiment also includes an EGR device 43. The EGR device 43 includes an EGR passage 43a connecting a position of the exhaust passage 41 upstream of the turbine of the turbocharger 5 with a position of the intake passage 1 downstream of the compressor of the turbocharger 5 (more specifically, downstream of the intercooler 8), an EGR cooler 43b for cooling the exhaust gas passing through the EGR passage 43a, a first EGR valve 43c for adjusting a flow rate of the exhaust gas passing through the EGR passage 43a, an EGR cooler bypass passage 43d for causing the exhaust gas to bypass the EGR cooler 43b, and a second EGR valve 43e for adjusting a flow rate of the exhaust gas passing through the EGR cooler bypass passage 43d. Note that the EGR passage 43a may be referred to as "first EGR passage," and the EGR cooler bypass passage 43d may be referred to as "second EGR passage."

Figure 3:
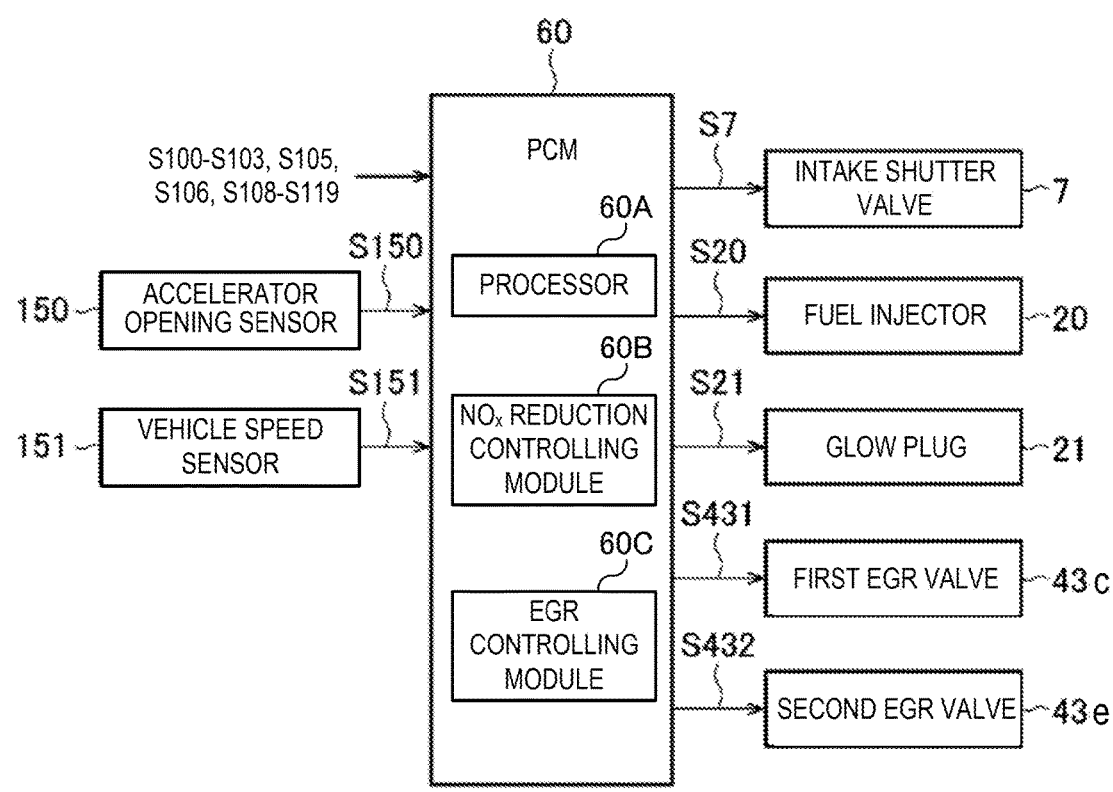
FIG. 3 is a block diagram illustrating an electrical configuration of the exhaust emission control system of the engine of the embodiment.

Next, an electrical configuration of the exhaust emission control system of the engine of the embodiment is described with reference to FIG. 3.

Based on the detection signals S100 to S103, S105, S106 and S108 to S119 of the various sensors 100 to 103, 105, 106 and 108 to 119 described above, and detection signals S150 and S151 outputted by an accelerator opening sensor 150 for detecting a position of an accelerator pedal (accelerator opening) and a vehicle speed sensor 151 for detecting a vehicle speed, respectively, the PCM 60 of this embodiment outputs a control signal S20 for mainly controlling the fuel injector 20, a control signal S7 for controlling the intake shutter valve 7, a control signal S21 for controlling the glow plug 21, and control signals S431 and S432 for controlling the first and second EGR valves 43c and 43e, respectively.

Particularly in this embodiment, the PCM 60 executes a $NO_x$ reduction control in which the fuel injector 20 is controlled to perform a post injection to control the air-fuel ratio of the exhaust gas to a target air-fuel ratio (specifically, a given air-fuel ratio approximately equal to or smaller than a theoretical air-fuel ratio), so that the $NO_x$ catalyst 45 is controlled to reduce $NO_x$ stored therein. In other words, the PCM 60 performs the post injection after a main injection. In the main injection, the fuel is injected into the cylinder (in the main injection, typically various settings including a fuel injection amount are executed so as to obtain a lean air-fuel ratio) so as to output an engine torque according to an accelerator operation by a vehicle operator. In the post injection, the fuel is injected at a timing so that the engine torque output is not influenced (e.g., expansion stroke) so as to achieve $\lambda \approx 1$ or $\lambda < 1$ and reduce $NO_x$ stored in the $NO_x$ catalyst 45. Hereinafter, such a control for reducing $NO_x$ stored in the $NO_x$ catalyst 45 is referred to as "$DeNO_x$ control." Note that "De" in the word "$DeNO_x$" is a prefix meaning separation or removal.

The PCM 60 is comprised of a processor 60A (e.g., a CPU (central processing unit)), various programs which are interpreted and executed by the processor 60A (including a basic control program, such as an OS, and an application program activated on the OS and realizing a specific function), and an internal memory such as ROM(s) and/or RAM(s), for storing programs and various data. The processor 60A is configured to execute at least a $NO_x$ reduction controlling module 60B and an EGR controlling module 60C to perform their respective functions of a $NO_x$ reduction control and control of EGR valves. These modules are stored in the internal memory as one or more software programs.

<Fuel Injection Control>

Next, a fuel injection control of this embodiment is described. This fuel injection control is started when an ignition of the vehicle is turned on and the PCM 60 is powered on, and repeatedly executed at a given cycle.

First, the PCM 60 acquires an operating state of the vehicle. For example, the PCM 60 acquires at least the accelerator opening detected by the accelerator opening sensor 150, the vehicle speed detected by the vehicle speed sensor 151, the crank angle detected by the crank angle sensor 100, and a gear range currently set in a transmission of the vehicle.

Next, the PCM 60 sets a target acceleration based on the acquired operating state of the vehicle. For example, the PCM 60 selects, from a plurality of acceleration characteristic maps (created in advance and stored in the memory) defined for various vehicle speeds and various gear ranges, an acceleration characteristic map corresponding to the current vehicle speed and gear range, and determines the target acceleration corresponding to the current accelerator opening by referring to the selected acceleration characteristic map.

Next, the PCM 60 determines a target torque of the engine E to achieve the determined target acceleration. In this case, the PCM 60 determines the target torque within a range of torque which the engine E is possible to output, based on the current vehicle speed, the gear range, a current road surface inclination, a road surface µ, etc.

Next, the PCM 60 calculates the fuel injection amount to be injected from the fuel injector 20 based on the target torque and the engine speed, so as to output the determined target torque from the engine E. This fuel injection amount is applied in the main injection (main injection amount).

On the other hand, in parallel with the above processing, the PCM 60 sets a fuel injection pattern according to the operating state of the engine E. For example, when performing the above DeNO$_x$ control, the PCM 60 sets a fuel injection pattern in which at least the post injection is performed in addition to the main injection. In this case, the PCM 60 also determines the fuel injection amount applied in the post injection (post injection amount) and the timing to perform the post injection (post injection timing etc.), of which details are described later.

Then, the PCM 60 controls the fuel injector 20 based on the calculated main injection amount and the set fuel injection pattern (including the post injection amount and the post injection timing in the case where the post injection is performed). In other words, the PCM 60 controls the fuel injector 20 so that a desired amount of fuel is injected in a desired fuel injection pattern.

Next, a method of calculating the post injection amount applied in the DeNO$_x$ control (hereinafter, referred to as "DeNO$_x$ post injection amount") in this embodiment is described. The PCM 60 repeatedly executes this method at a given cycle in parallel with the above fuel injection control process. In other words, the DeNO$_x$ post injection amount is calculated as needed during the fuel injection control.

First, the PCM 60 acquires the operating state of the engine E. For example, the PCM 60 at least acquires the intake air amount (fresh air amount) detected by the airflow sensor 101, the oxygen concentration within the exhaust gas (exhaust gas oxygen concentration) detected by the O$_2$ sensor 111, and the main injection amount calculated in the above fuel injection control. The PCM 60 also acquires an exhaust gas amount (EGR gas amount) recirculated to the intake system IN by the EGR device 43, which is obtained based on a given model, for example.

Subsequently, the PCM 60 calculates an amount of air introduced into the engine E (i.e., charging amount) based on the acquired fresh air amount and the EGR gas amount. Further, the PCM 60 calculates an oxygen concentration within the air introduced into the engine E based on the calculated charging amount.

Next, the PCM 60 calculates the post injection amount (DeNO$_x$ post injection amount) required in the post injection, which is performed in addition to the main injection, to control the air-fuel ratio to the target air-fuel ratio (the air-fuel ratio approximately equal to or smaller than the theoretical air-fuel ratio) in order to reduce the NO$_x$ stored in the NO$_x$ catalyst 45. In other words, the PCM 60 determines the post injection amount required in addition to the main injection amount in order to bring the air-fuel ratio of the exhaust gas to the target air-fuel ratio. In this case, the PCM 60 calculates the DeNO$_x$ post injection amount in consideration of the difference between the acquired oxygen concentration (the oxygen concentration detected by the O$_2$ sensor 111) and the calculated oxygen concentration. For example, based on the air-fuel ratio of the exhaust gas generated when the fuel injected in the main injection is combusted, the PCM 60 suitably performs feedback processing according to the difference between the detected oxygen concentration and the calculated oxygen concentration, and calculates the DeNO$_x$ post injection amount for controlling the air-fuel ratio to the target air-fuel ratio. By calculating the DeNO$_x$ post injection amount as described above, the air-fuel ratio of the exhaust gas is accurately controlled to the target air-fuel ratio by the post injection in the DeNO$_x$ control, and the NO$_x$ stored in the NO$_x$ catalyst 45 is surely reduced.

<DeNO$_x$ Control>

Hereinafter, the DeNO$_x$ control of this embodiment is described in detail.

(Basic Concept)

First, a basic concept of the DeNO$_x$ control of this embodiment is described.

In this embodiment, when the NO$_x$ stored amount in the NO$_x$ catalyst 45 is above a given amount, typically, when the NO$_x$ stored amount is approximately equal to a limit value (e.g., the capacity of the NO$_x$ catalyst 45), the PCM 60 executes the DeNO$_x$ control in which the fuel injector 20 is controlled to perform the post injection so that the air-fuel ratio is continuously controlled to the target air-fuel ratio, in order to reduce NO$_x$ stored in the NO$_x$ catalyst 45 to substantially zero (may suitably be referred to as "first NO$_x$ reduction control" or "active DeNO$_x$ control"). In this manner, a large amount of NO$_x$ stored in the NO$_x$ catalyst 45 is forcibly reduced and the NO$_x$ purification performance of the NO$_x$ catalyst 45 is reliably secured.

Even if the NO$_x$ stored amount in the NO$_x$ catalyst 45 is below the given amount, when the air-fuel ratio becomes rich due to acceleration of the vehicle, the PCM 60 executes a DeNO$_x$ control in which the fuel injector 20 is controlled to perform the post injection so as to temporarily control the air-fuel ratio to the target air-fuel ratio, in order to reduce NO$_x$ stored in the NO$_x$ catalyst 45 (may suitably be referred to as "second NO$_x$ reduction control" or "passive DeNO$_x$ control"). In the passive DeNO$_x$ control, the post injection is performed to control the air-fuel ratio to the target air-fuel ratio under a situation where the air-fuel ratio reduces due to the increase of the main injection amount, such as during acceleration of the vehicle. Therefore, the post injection amount for controlling the air-fuel ratio to the target air-fuel ratio is smaller compared to a case of executing the DeNO$_x$ control in a situation where the air-fuel ratio does not reduce (i.e., no acceleration). Moreover, since the passive DeNO$_x$ control is executed accompanying the acceleration of the vehicle, the frequency of executing this control is comparatively high.

In this embodiment, by applying such a passive DeNO$_x$ control, DeNO$_x$ is performed frequently while preventing a fuel consumption increase due to DeNO$_x$. Although the passive DeNO$_x$ control is executed only for a comparatively short period of time, since it is executed frequently, the NO$_x$ stored amount in the NO$_x$ catalyst 45 is efficiently reduced. As a result, the NO$_x$ stored amount in the NO$_x$ catalyst 45 does not easily exceed the given amount, therefore the execution frequency of the active DeNO$_x$ control which requires a larger amount of post injection amount than in the passive DeNO$_x$ control is lowered, thus it becomes possible to effectively prevent the fuel consumption increase due to DeNO$_x$.

Further in this embodiment, when executing the above active DeNO$_x$ control, the fuel injected in the post injection (hereinafter, referred to as "post-injected fuel") is combusted inside the cylinder of the engine E to control the air-fuel ratio to the target air-fuel ratio. Here, the PCM 60 performs the post injection at a timing so that the post-injected fuel is combusted inside the cylinder. For example, the PCM 60 sets a given timing in an early half of the expansion stroke of the engine E as the post injection timing of the active DeNO$_x$ control. By applying such a post injection timing of the active DeNO$_x$ control, it is possible to prevent discharge of the post-injected fuel as unburned fuel (i.e., HC) or oil dilution due to the post-injected fuel.

On the other hand, in this embodiment, when executing the passive DeNO$_x$ control, the PCM 60 controls the air-fuel ratio to the target air-fuel ratio by discharging the post-injected fuel as unburned fuel into the exhaust passage 41 without combusting it inside the cylinder of the engine E. In this case, the PCM 60 performs the post injection at a timing so that the post-injected fuel is discharged from the cylinder to the exhaust passage 41 as unburned fuel. For example, the PCM 60 sets a given timing in a latter half of the expansion stroke of the engine E as the post injection timing of the passive $DeNO_x$ control. The post injection timing of this passive $DeNO_x$ control is retarded compared to the post injection timing of the active $DeNO_x$ control in principle. By applying such a post injection timing of the passive $DeNO_x$ control, generation of smoke (soot) due to the post-injected fuel being combusted inside the cylinder is prevented.

Here, operating ranges of the engine E within which the passive $DeNO_x$ control and the active $DeNO_x$ control are executed in the embodiment are described with reference to FIG. 4 in which the horizontal axis shows engine speed and the vertical axis shows engine load. Further in FIG. 4, the curve L1 indicates a highest torque line of the engine E.

Figure 4:
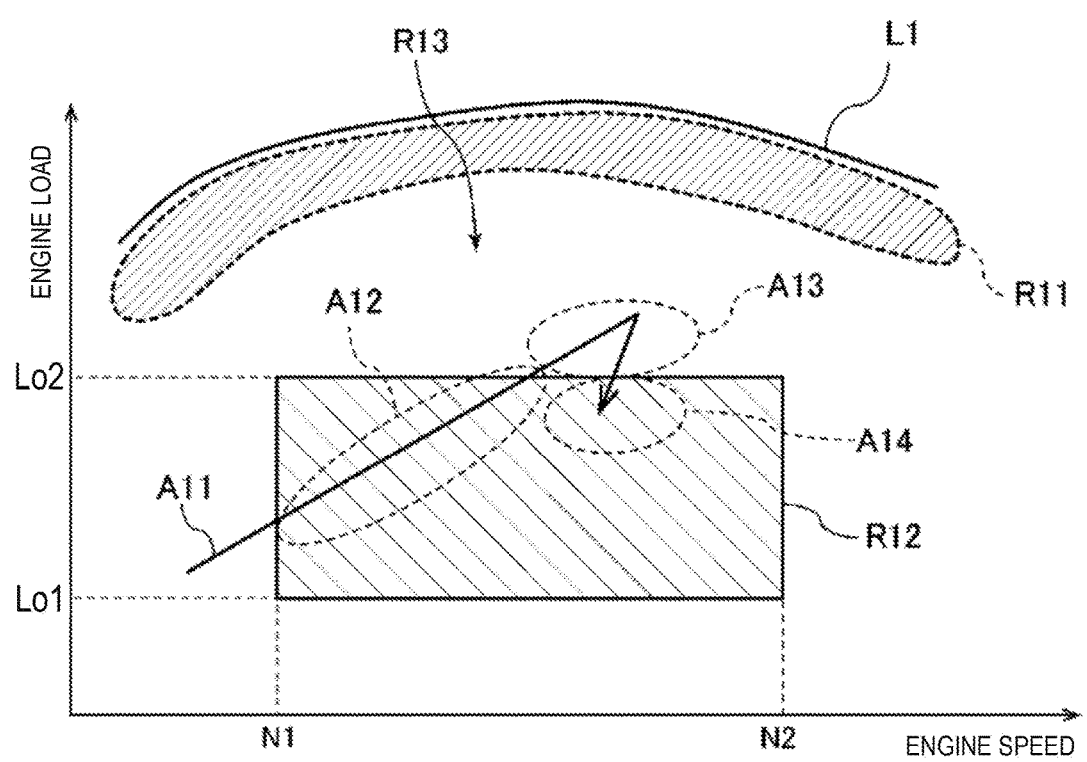
FIG. 4 is a chart illustrating operating ranges of the engine within which a passive $DeNO_x$ control and an active $DeNO_x$ control are performed, respectively, in the embodiment.

As illustrated in FIG. 4, in this embodiment, the PCM 60 executes the active $DeNO_x$ control when the engine load is within a medium load range equal to and higher than a first load Lo1 but lower than a second load Lo2 (>first load Lo1) and the engine speed is within a medium speed range equal to and higher than a first speed N1 but lower than a second speed N2 (>first speed N1), i.e., the engine load and the engine speed are within an operating range indicated by R12 (hereinafter, referred to as "active $DeNO_x$ execution range R12"). The active $DeNO_x$ execution range R12 is adopted because of the following reason.

As described above, in the case of executing the active $DeNO_x$ control, in view of preventing HC generation caused by the post-injected fuel being discharged as it is, the oil dilution by the post-injected fuel, etc., the post injection is performed at the timing so that the fuel is combusted inside the cylinder. In this case, in this embodiment, when the post-injected fuel is combusted, the generation of smoke and also HC (i.e., discharge of unburned fuel due to incomplete combustion) is prevented. For example, the time for the post-injected fuel to combust is extended as long as possible, i.e., ignition is caused in a state where air and fuel are suitably mixed, so that the generation of smoke and HC is prevented. Therefore, in the active $DeNO_x$ control, a suitable amount of EGR gas is introduced to effectively delay the ignition of the post-injected fuel.

Note that the reason for preventing the HC generation during the active $DeNO_x$ control is to prevent that, in the case where the EGR gas is introduced as described above, HC also recirculates to the intake system IN as EGR gas and this HC serves as a binder to combine with soot and clog the gas passage. In addition, when the active $DeNO_x$ control is executed within an operating range within which the temperature of the $NO_x$ catalyst 45 is low and HC purification performance (purification performance of HC due to DOC in the $NO_x$ catalyst 45) is not secured, the HC generation reduction is performed to prevent the HC from being discharged without being purified. The active $DeNO_x$ execution range R12 also includes a range where the temperature of the $NO_x$ catalyst 45 is relatively low and thus cannot secure such HC purification performance.

The reason for preventing smoke generation in the active $DeNO_x$ control is to prevent that, DPF regeneration for combusting and removing PM corresponding to smoke being captured by the DPF 46 (a control of performing post injection similar to the $DeNO_x$ control) is performed frequently and the fuel consumption increases.

Incidentally, when the engine load becomes high, since the air introduced into the engine E is reduced to achieve the target air-fuel ratio, the amount of oxygen required for suitable combustion of the post-injected fuel becomes insufficient and smoke and HC tend to be generated. Especially, as the engine load increases, the in-cylinder temperature rises and the post-injected fuel is ignited without sufficient time from the post injection of the fuel, i.e., combustion occurs before air and fuel are properly mixed, which causes the generation of smoke and HC. On the other hand, within an operating range where the engine load is considerably low, the temperature of the $NO_x$ catalyst 45 is low and the $NO_x$ catalyst 45 does not perform the $NO_x$ reducing function sufficiently. In addition, within this range, the post-injected fuel does not suitably combust, i.e., a misfire occurs.

Although in the above description the phenomenon related to the engine load is described, the same phenomenon occurs with the engine speed.

Thus, in this embodiment, the operating range of the engine E corresponding to the medium load range and the medium speed range is adopted as the active $DeNO_x$ execution range R12 where the active $DeNO_x$ control is executed. In other words, in this embodiment, the active $DeNO_x$ control is executed only within the active $DeNO_x$ execution range R12 and is prohibited outside the active $DeNO_x$ execution range R12. Within the operating range where the active $DeNO_x$ control is prohibited, especially where the engine load or the engine speed is higher than within the active $DeNO_x$ execution range R12 (the range assigned with the reference character "R13"), since the $NO_x$ purification performance of the SCR catalyst 47 is sufficient, the SCR catalyst 47 purifies $NO_x$, and the discharge of $NO_x$ from the vehicle is prevented without executing the $DeNO_x$ control.

Further in this embodiment, within a range where the engine load is higher than the range R13 where the SCR catalyst 47 purifies $NO_x$ (the range assigned with the reference character "R11", hereinafter referred to as "passive $DeNO_x$ execution range R11"), since the amount of exhaust gas increases and the SCR catalyst 47 cannot purify all $NO_x$, the passive $DeNO_x$ control is executed. In this passive $DeNO_x$ control, as described above, the post injection is performed at the timing so that the post-injected fuel is discharged from the cylinder to the exhaust passage 41 as unburned fuel. Within the passive $DeNO_x$ execution range R11, since the temperature of the $NO_x$ catalyst 45 is sufficiently high and suitable purification performance of HC (HC purification performance of the DOC in the $NO_x$ catalyst 45) is secured, the $NO_x$ catalyst 45 properly purifies the unburned fuel discharged as described above.

Note that if the post-injected fuel is combusted inside the cylinder in the passive $DeNO_x$ control as in the active $DeNO_x$ control, smoke is generated. The reason for this is similar to the reason for prohibiting execution of the active $DeNO_x$ control when the engine load becomes high. Therefore, in the passive $DeNO_x$ control, the post-injected fuel is discharged from the cylinder to the exhaust passage 41 as unburned fuel.

Here, a specific example of the active $DeNO_x$ control when the operating state of the engine changes as indicated by the arrow A11 in FIG. 4 is described. First, when the operating state of the engine enters the active $DeNO_x$ execution range R12 (see the area indicated by the reference character A12), the PCM 60 executes the active $DeNO_x$ control. Then, when the operating state of the engine reaches outside the active $DeNO_x$ execution range R12 (see the area indicated by the reference character A13), the PCM 60 suspends the active $DeNO_x$ control, and the SCR catalyst 47 purifies $NO_x$. When the operating state of the engine re-enters the active $DeNO_x$ execution range R12 (see the area indicated by the reference character A14), the PCM 60 resumes the active $DeNO_x$ control. In this manner, the active $DeNO_x$ control is carried on until $NO_x$ stored in the $NO_x$ catalyst 45 drops almost down to zero.

Next, the temperature ranges within which the passive $DeNO_x$ control and the active $DeNO_x$ control are executed in the embodiment are described. Typically, the $NO_x$ catalyst 45 exerts the $NO_x$ purification performance within a relatively low temperature range, and the SCR catalyst 47 exerts $NO_x$ purification performance within a relatively high temperature range, e.g., higher than the range where the $NO_x$ catalyst 45 exerts the $NO_x$ purification performance. In this embodiment, the temperature close to a lowest value within the temperature range where the $NO_x$ purification rate higher than a given value is obtainable by the SCR catalyst 47 is used as a determination temperature (hereinafter, referred to as "SCR determination temperature"). The passive $DeNO_x$ control or the active $DeNO_x$ control is executed only when the temperature of the SCR catalyst 47 (hereinafter, referred to as "SCR temperature") is below the SCR determination temperature. If the SCR temperature is above the SCR determination temperature, executions of the passive $DeNO_x$ control and the active $DeNO_x$ control are prohibited. The reason for the prohibition is that since the SCR catalyst 47 suitably purifies $NO_x$ within the exhaust gas when the SCR temperature is above the SCR determination temperature, the $DeNO_x$ control is not particularly needed to secure the $NO_x$ purification performance of the $NO_x$ catalyst 45. Therefore, in this embodiment, when the SCR temperature is above the SCR determination temperature, execution of the $DeNO_x$ control is prohibited to prevent the fuel consumption increase.

Hereinafter, the passive $DeNO_x$ control and the active $DeNO_x$ control of this embodiment are described in detail.

(Passive $DeNO_x$ Control)

The passive $DeNO_x$ control of this embodiment is specifically described.

Figure 5:
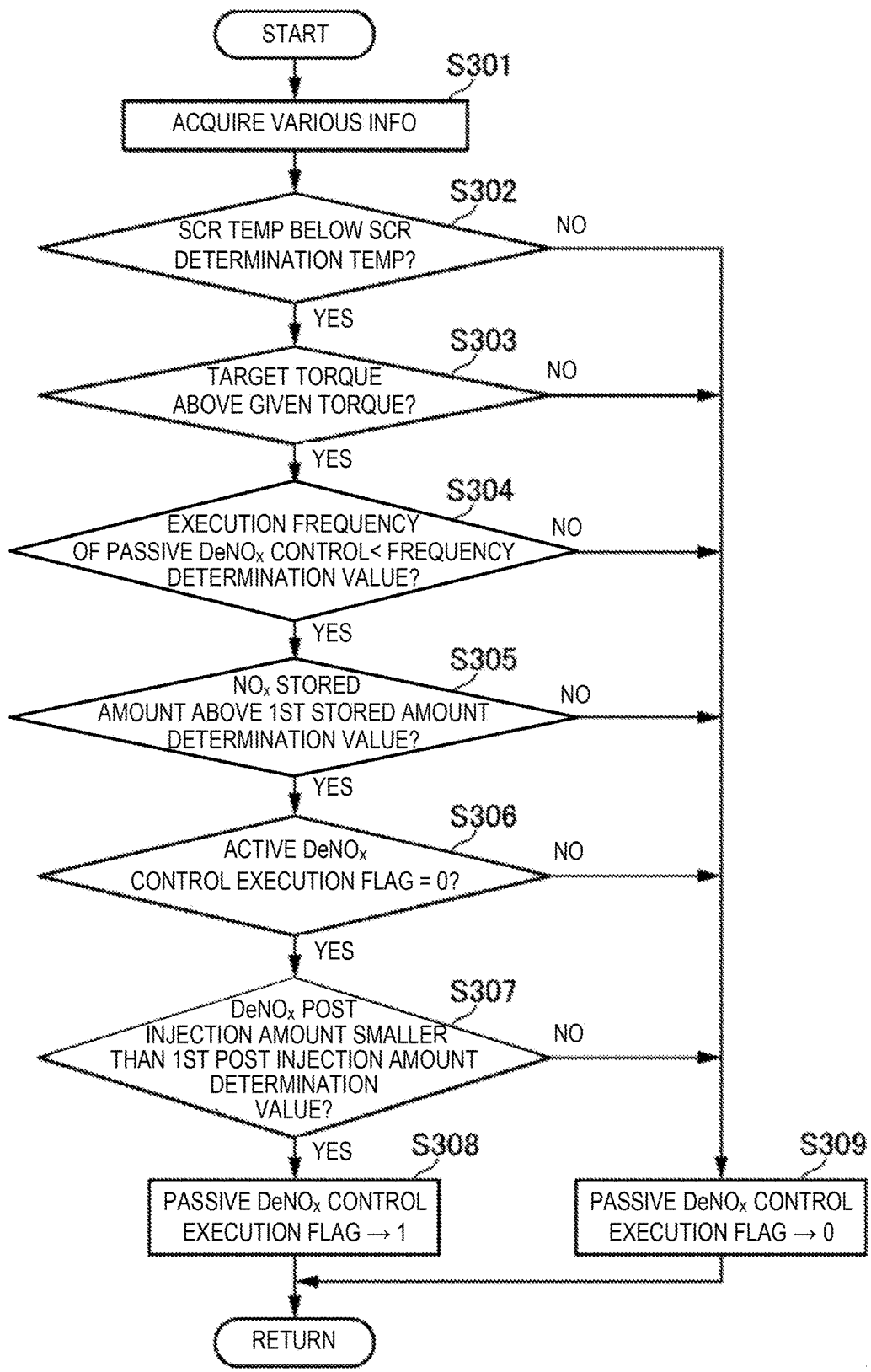
FIG. 5 is a flowchart illustrating setting of a passive $DeNO_x$ control execution flag of the embodiment.

First, setting of a passive $DeNO_x$ control execution flag which is for determining whether to execute the passive $DeNO_x$ control in this embodiment is described with reference to the flowchart (passive $DeNO_x$ control execution flag setting process) of FIG. 5. The PCM 60 repeatedly executes this passive $DeNO_x$ control execution flag setting process at a given cycle in parallel with the fuel injection control and the $DeNO_x$ post injection amount calculation.

First, at S301, the PCM 60 acquires various information of the vehicle. For example, the PCM 60 acquires at least an $NO_x$ catalyst temperature, the SCR temperature, the target torque determined in the fuel injection control, the $DeNO_x$ post injection amount calculated in the $DeNO_x$ post injection amount calculation, the $NO_x$ stored amount in the $NO_x$ catalyst 45, and a value of an active $DeNO_x$ control execution flag used for determining whether to execute the active $DeNO_x$ control. Here, the $NO_x$ catalyst temperature is estimated, for example, based on the temperature detected by the temperature sensor 112 disposed immediately upstream of the $NO_x$ catalyst 45 (the temperature detected by the temperature sensor 113 disposed between the $NO_x$ catalyst 45 and the DPF 46 may also be used). The SCR temperature is estimated based on, for example, the temperature detected by the temperature sensor 117 disposed immediately upstream of the SCR catalyst 47. The $NO_x$ stored amount is obtained by estimating the amounts of $NO_x$ within the exhaust gas based on the operating state of the engine E, the flow rate of the exhaust gas, the temperature of the exhaust gas, etc., and integrating the $NO_x$ amounts. The active $DeNO_x$ control execution flag is set by an active $DeNO_x$ control execution flag setting process described later (see FIG. 7).

At S301, the PCM 60 also acquires the execution frequency of the passive $DeNO_x$ control within a given period. For example, the PCM 60 acquires the number of times the passive $DeNO_x$ control is executed within a given period (e.g., several seconds or several minutes) as the execution frequency of the passive $DeNO_x$ control.

Next, at S302, the PCM 60 determines whether the SCR temperature acquired at S301 is below an SCR determination temperature T11. If the SCR temperature is below the SCR determination temperature T11 (S302: YES), the process proceeds to S303. On the other hand, if the SCR temperature is above the SCR determination temperature T11 (S302: NO), the process proceeds to S309. In this case, the PCM 60 sets the passive $DeNO_x$ control execution flag to "0" to prohibit execution of the passive $DeNO_x$ control (S309) since the $NO_x$ within the exhaust gas is suitably purified by the SCR catalyst 47. Then, the process ends.

Note that at S302, whether the exhaust gas flow rate is above a given amount may be determined in addition to whether the SCR temperature being below the SCR determination temperature T11. In this case, even if the SCR temperature is above the SCR determination temperature T11, as long as the exhaust gas flow rate is determined to be above the given amount, the passive $DeNO_x$ control execution flag is preferably not set to "0." The reason for this is to perform the passive $DeNO_x$ control and secure the $NO_x$ purification performance of the $NO_x$ catalyst 45, in consideration that the $NO_x$ purification rate of the SCR catalyst 47 decreases as the exhaust gas amount increases.

At S303, the PCM 60 determines whether the target torque acquired at S301 is above a given torque. This determination is equivalent to determining whether the air-fuel ratio when the fuel corresponding to the target torque is injected falls below a given value on the rich side. In other words, it is equivalent to determining whether the current operating state is an operating state where the passive $DeNO_x$ control is executable while preventing the fuel consumption increase (given acceleration state). If the target torque is above the given torque (S303: YES), the process proceeds to S304. On the other hand, if the target torque is lower than the given torque (S303: NO), the process proceeds to S309. In this case, the PCM 60 sets the passive $DeNO_x$ control execution flag to "0" to prohibit execution of the passive $DeNO_x$ control and prevent the fuel consumption increase (S309). Then, the process ends.

At S304, the PCM 60 determines whether the execution frequency of the passive $DeNO_x$ control acquired at S301 is below a given frequency determination value. If this execution frequency is below the frequency determination value (S304: YES), the process proceeds to S305. On the other hand, if the execution frequency is above the frequency determination value (S304: NO), the process proceeds to S309. In this case, the PCM 60 sets the passive $DeNO_x$ control execution flag to "0" to prohibit execution of the passive $DeNO_x$ control (S309).

If the passive $DeNO_x$ control is executed in a situation where the passive $DeNO_x$ control has been carried out comparatively frequently, there is a high possibility that oil dilution occurs due to the post injection. Therefore, in this embodiment, when the execution frequency of the passive $DeNO_x$ control is above the frequency determination value (S304: NO), execution of the passive $DeNO_x$ control is prohibited so as to prevent the oil dilution due to the post injection of the passive DeNO$_x$ control. On the other hand, even if the passive DeNO$_x$ control is executed in a situation where the passive DeNO$_x$ control has hardly been carried out (i.e., the execution frequency of the passive DeNO$_x$ control is comparatively low), the possibility of oil dilution occurring due to the post injection is low. Therefore, in this embodiment, when the execution frequency of the passive DeNO$_x$ control is lower than the frequency determination value (S304: YES), execution of the passive DeNO$_x$ control is allowed.

Next, at S305, the PCM 60 determines whether the NO$_x$ stored amount acquired at S301 is above a first stored amount determination value. For example, the first stored amount determination value is set to a value that is approximately half of the limit value of the NO$_x$ storable amount. As a result of this determination, if the NO$_x$ stored amount is above the first stored amount determination value (S305: YES), the process proceeds to S306. On the other hand, if the NO$_x$ stored amount is lower than the first stored amount determination value (S305: NO), the process proceeds to S309. In this case, the PCM 60 sets the passive DeNO$_x$ control execution flag to "0" to prohibit unnecessary execution of the passive DeNO$_x$ control and prevent the fuel consumption increase (S309). Then, the process ends.

At S306, the PCM 60 determines whether the active DeNO$_x$ control execution flag acquired at S301 is "0." In other words, the PCM 60 determines whether to execute the active DeNO$_x$ control. If the active DeNO$_x$ control execution flag is "0" (S306: YES), the process proceeds to S307. On the other hand, if the active DeNO$_x$ control execution flag is not "0," i.e., if it is "1" (S306: NO), the process proceeds to S309. In this case, the PCM 60 sets the passive DeNO$_x$ control execution flag to "0" to prohibit execution of the passive DeNO$_x$ control and preferentially execute the active DeNO$_x$ control (S309). In other words, even if the execution condition of the passive DeNO$_x$ control is satisfied, when the execution condition of the active DeNO$_x$ control is satisfied, the active DeNO$_x$ control is preferentially executed. Then, the process ends.

At S307, the PCM 60 determines whether the DeNO$_x$ post injection amount acquired at S301 is smaller than a first post injection amount determination value. If the DeNO$_x$ post injection amount is smaller than the first post injection amount determination value (S307: YES), the process proceeds to S308. Typically, this condition at S307 is satisfied when the vehicle is accelerating (more specifically, a prerequisite for satisfying this condition is for the vehicle to be accelerating). In this case, since all the conditions at S302 to S307 are satisfied, the PCM 60 sets the passive DeNO$_x$ control execution flag to "1" to permit execution of the passive DeNO$_x$ control (S308). Then, the process ends. On the other hand, if the DeNO$_x$ post injection amount is above the first post injection amount determination value (S307: NO), the process proceeds to S309. In this case, since the post injection is performed with a comparatively large amount of fuel and there is a high possibility of oil dilution, the PCM 60 sets the passive DeNO$_x$ control execution flag to "0" to prohibit execution of the passive DeNO$_x$ control and prevent the oil dilution (S309). Then, the process ends.

Note that in one example, the first post injection amount determination value used in the determination of S307 is preferably set with reference to a post injection amount which highly possibly will cause oil dilution. In another example, the first post injection amount determination value may be set in view of preventing, in addition to the oil dilution, the fuel consumption increase caused by execution of the passive DeNO$_x$ control. In such a case, determining whether the DeNO$_x$ post injection amount is below the first post injection amount determination value at S307 is equivalent to determining whether the air-fuel ratio when the amount of fuel corresponding to the target torque is injected falls below the given value. In other words, it is substantially the same as determining whether the target torque acquired is above the given torque at S303. Therefore, since the determination at S303 and the determination at S307 are redundant, the passive DeNO$_x$ control execution flag may be set by performing the determination at S307 without performing the determination at S303, for example.

Further, the first post injection amount determination value is not limited to be a fixed value, and may be changed according to an in-cylinder temperature. For example, the first post injection amount determination value may be increased as the in-cylinder temperature rises. Since vaporization of the post-injected fuel progresses and oil dilution becomes less likely to occur when the in-cylinder temperature rises, the restriction on the DeNO$_x$ post injection amount in executing the passive DeNO$_x$ control may be loosened, i.e., an upper limit of the DeNO$_x$ post injection amount may be increased.

Figure 6:
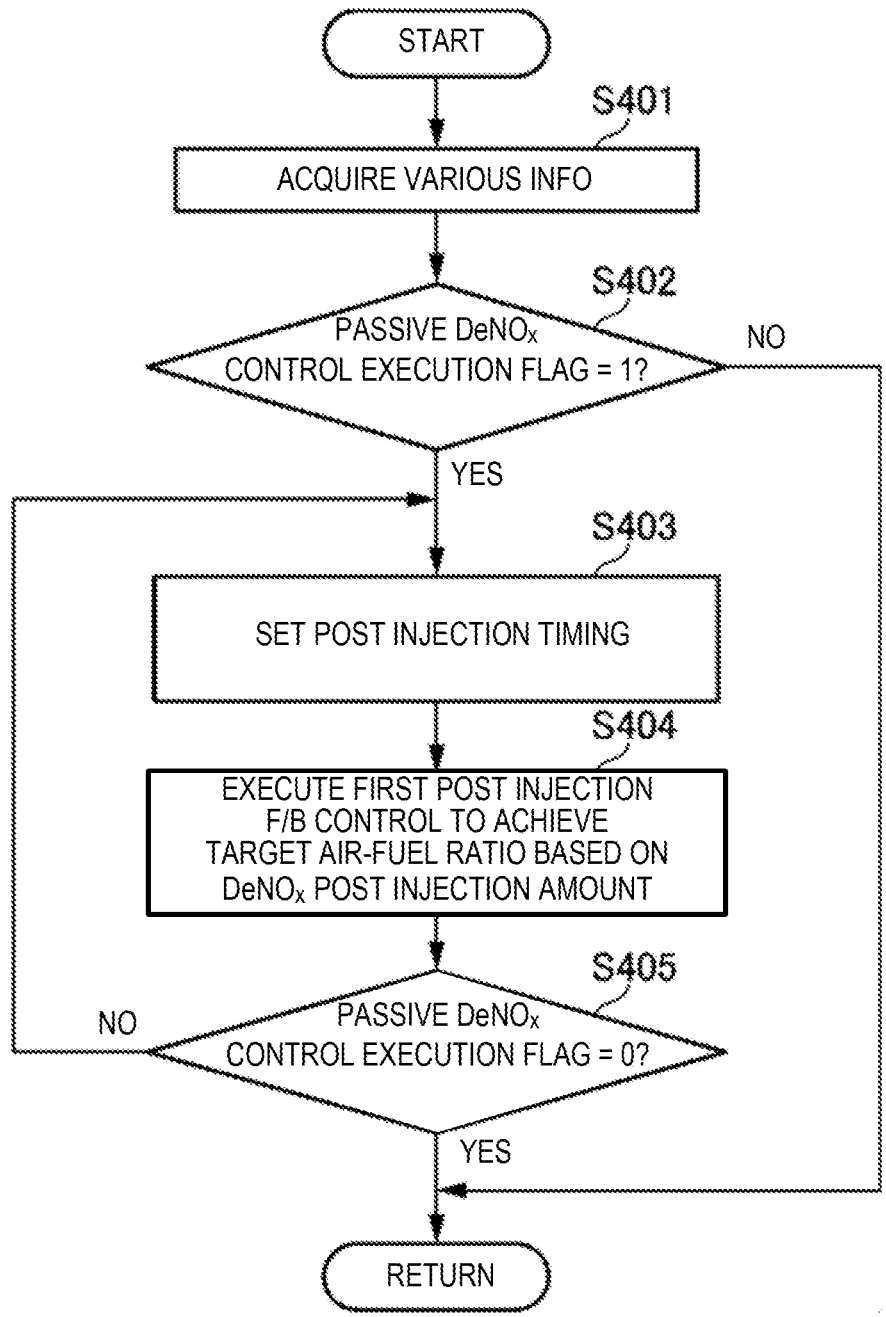
FIG. 6 is a flowchart illustrating the passive $DeNO_x$ control of the embodiment.

Next, the passive DeNO$_x$ control of this embodiment, which is executed based on the passive DeNO$_x$ control execution flag set as described above, is described with reference to the flowchart (passive DeNO$_x$ control process) of FIG. 6. The PCM 60 repeatedly executes this passive DeNO$_x$ control process at a given cycle in parallel with the fuel injection control, the DeNO$_x$ post injection amount calculation, and the passive DeNO$_x$ control execution flag setting process illustrated in FIG. 5.

First, at S401, the PCM 60 acquires various information of the vehicle. For example, the PCM 60 acquires at least the DeNO$_x$ post injection amount calculated in the DeNO$_x$ post injection amount calculation and the value of the passive DeNO$_x$ control execution flag set in the passive DeNO$_x$ control execution flag setting process illustrated in FIG. 5.

Next, at S402, the PCM 60 determines whether the passive DeNO$_x$ control execution flag acquired at S401 is "1." In other words, the PCM 60 determines whether the passive DeNO$_x$ control to be executed. If the passive DeNO$_x$ control execution flag is "1" (S402: YES), the process proceeds to S403. On the other hand, if the passive DeNO$_x$ control execution flag is "0" (S402: NO), the process is terminated without executing the passive DeNO$_x$ control.

At S403, the PCM 60 sets the post injection timing applied in the passive DeNO$_x$ control. The method of this setting is described in detail.

As described above, in this embodiment, when executing the passive DeNO$_x$ control, in view of preventing smoke generation due to the combustion of the post-injected fuel, the air-fuel ratio is controlled to the target air-fuel ratio by discharging the post-injected fuel to the exhaust passage 41 as unburned fuel. In order to discharge the post-injected fuel as unburned fuel, the post injection may be performed at a comparatively retarded timing on the expansion stroke. However, if the post injection timing is retarded excessively, oil dilution occurs due to the post injection. Therefore, in this embodiment, in view of preventing generation of smoke and oil dilution, a suitable timing in the latter half of the expansion stroke is typically adopted as the post injection timing of the passive DeNO$_x$ control. In this embodiment, the post injection timing at least in the latter half of the expansion stroke is retarded more as the in-cylinder temperature rises. This is because when the in-cylinder temperature rises, even if the post injection timing is retarded more, vaporization of the post-injected fuel progresses and oil dilution becomes less likely to occur.

Note that since it is difficult to detect the in-cylinder temperature with a sensor or estimate it at high accuracy, the PCM 60 may set the post injection timing by using various indexes which reflect the in-cylinder temperature. For example, the PCM 60 sets the post injection timing based on the engine water temperature and/or the intake air temperature. In this example, the PCM 60 retards the post injection timing as the engine water temperature rises or retards the post injection timing as the intake air temperature rises.

Although in the above description the post injection timing is changed according to the in-cylinder temperature, in another example, the post injection timing may not be changed according to the in-cylinder temperature, etc., and a fixed value may be applied to the post injection timing (i.e., fixed timing in the latter half of the expansion stroke).

Next, at S404, the PCM 60 controls the fuel injector 20 to inject the $DeNO_x$ post injection amount acquired at S401, at the post injection timing set at S403, so as to control the air-fuel ratio to the target air-fuel ratio and reduce the $NO_x$ stored in the $NO_x$ catalyst 45. For example, due to variations in detections of the various sensors, variations in the fuel injection amount of the fuel injector 20, etc., based on the air-fuel ratio corresponding to the detection value of the $O_2$ sensor 111 disposed in the exhaust passage 41 (actual air-fuel ratio) and the target air-fuel ratio, the PCM 60 executes a F/B (feedback) control of the post injection amount injected from the fuel injector 20 so as to match the actual air-fuel ratio with the target air-fuel ratio. Hereinafter, the F/B control of the post injection amount executed in the passive $DeNO_x$ control is suitably referred to as "first post injection F/B control." Although in this first post injection F/B control an F/F control (feed-forward control) is executed in addition to the F/B control, since the F/B control is mainly executed, the term "F/B control" is used for the sake of convenience.

More specifically, the PCM 60 first sets a comparatively small air-fuel ratio (comparatively rich air-fuel ratio) as a target value, and executes the F/F control of the post injection amount from the fuel injector 20. Then the PCM 60 executes the F/B control of the post injection amount from the fuel injector 20 by using a comparatively large F/B gain based on the actual air-fuel ratio and the target air-fuel ratio. In this manner, the actual air-fuel ratio is made to promptly match with the target air-fuel ratio in the passive $DeNO_x$ control which is executed for a comparatively short period of time.

Note that practically, the PCM 60 executes the processing of S404 in the fuel injection control.

Next, at S405, the PCM 60 determines whether the passive $DeNO_x$ control execution flag is "0." In other words, the PCM 60 determines whether to end the passive $DeNO_x$ control. If the passive $DeNO_x$ control execution flag is "0" (S405: YES), the process ends. In this case, the PCM 60 ends the passive $DeNO_x$ control. On the other hand, if the passive $DeNO_x$ control execution flag is not "0" (S405: NO), i.e., if the passive $DeNO_x$ control execution flag is maintained at "1," the process returns to S403 to perform the process from S403 again. In this case, the PCM 60 continues the passive $DeNO_x$ control. In other words, the PCM 60 continues the passive $DeNO_x$ control until the passive $DeNO_x$ control execution flag switches from "1" to "0."

(Active $DeNO_x$ Control)

Next, the active $DeNO_x$ control according to this embodiment is specifically described.

Figure 7:
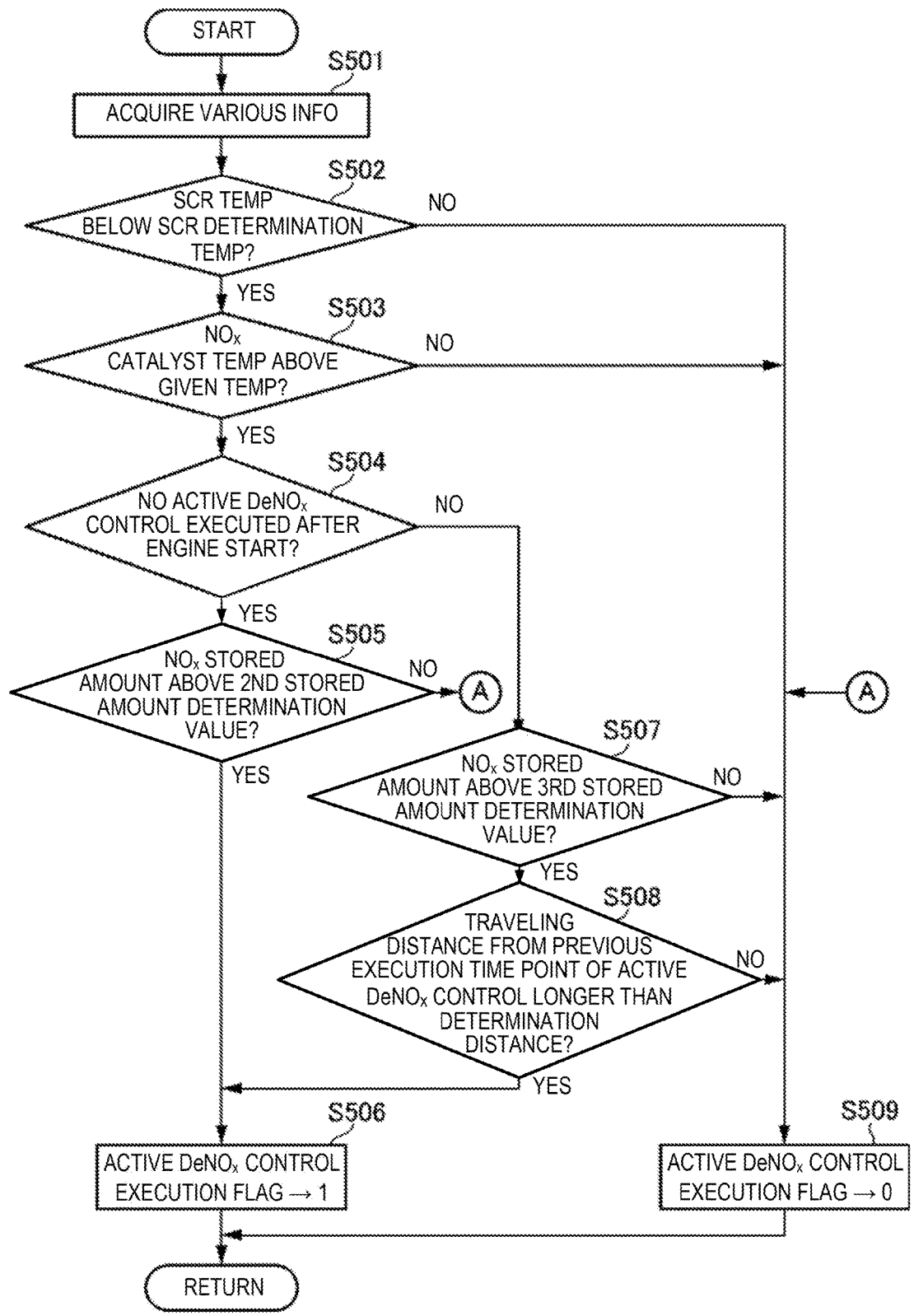
FIG. 7 is a flowchart illustrating setting of an active $DeNO_x$ control execution flag of the embodiment.

First, setting of the active $DeNO_x$ control execution flag used for determining whether to execute the active $DeNO_x$ control of the embodiment is described with reference to the flowchart (active $DeNO_x$ control execution flag setting process) of FIG. 7. The PCM 60 repeatedly executes this active $DeNO_x$ control execution flag setting process at a given cycle in parallel with the fuel injection control, the $DeNO_x$ post injection amount calculation, the passive $DeNO_x$ control execution flag setting process illustrated in FIG. 5, etc.

First, at S501, the PCM 60 acquires various information of the vehicle. For example, the PCM 60 at least acquires the $NO_x$ catalyst temperature, the SCR temperature, and the $NO_x$ stored amount in the $NO_x$ catalyst 45. Note that the methods of obtaining the $NO_x$ catalyst temperature, the SCR temperature, and the $NO_x$ stored amount are as described for S301 in the above "Passive $DeNO_x$ Control" section.

Next, at S502, the PCM 60 determines whether the SCR temperature acquired at S501 is below the SCR determination temperature T11. If the SCR temperature is below the SCR determination temperature T11 (S502: YES), the process proceeds to S503. On the other hand, if the SCR temperature is above the SCR determination temperature T11 (S502: NO), the process proceeds to S509. In this case, since the SCR catalyst 47 suitably purifies $NO_x$ within the exhaust gas, the PCM 60 sets the active $DeNO_x$ control execution flag to "0" to prohibit execution of the active $DeNO_x$ control (S509). Then, the process ends.

At S503, the PCM 60 determines whether the $NO_x$ catalyst temperature acquired at S501 is above a given temperature. When the $NO_x$ catalyst temperature is low, even if the air-fuel ratio is controlled to the target air-fuel ratio, the $NO_x$ catalyst 45 hardly reduces the stored NOx. Therefore, at S503, whether the $NO_x$ stored in the $NO_x$ catalyst 45 is reducible is determined. The given temperature used in the determination of S503 is set based on the $NO_x$ catalyst temperature at which the $NO_x$ stored in the $NO_x$ catalyst 45 is reducible. If the $NO_x$ catalyst temperature is above the given temperature (S503: YES), the process proceeds to S504. On the other hand, when the $NO_x$ catalyst temperature is below the given temperature (S503: NO), the process proceeds to S509. In this case, the PCM 60 sets the active $DeNO_x$ control execution flag to "0" to prohibit execution of the active $DeNO_x$ control (S509).

At S504, the PCM 60 determines whether the active $DeNO_x$ control has been executed even once after an engine start. The determination of S504 is performed so that if the active $DeNO_x$ control has not been executed after the engine start, the execution condition of the active $DeNO_x$ control is loosened than in the case where the active $DeNO_x$ control has been executed, so as to preferentially execute the active $DeNO_x$ control. For example, if the active $DeNO_x$ control has been executed (S504: NO), the execution condition of S507 and the execution condition of S508, which are comparatively strict, are used, whereas if the active $DeNO_x$ control has not been executed, only the execution condition of S505 which is comparatively loose is used (these are described later in detail). If the active $DeNO_x$ control has not been executed (S504: YES), the process proceeds to S505.

At S505, the PCM 60 determines whether the $NO_x$ stored amount acquired at S501 is above a second stored amount determination value. For example, the second stored amount determination value is set to a value somewhat lower than the limit value of the $NO_x$ stored amount. If the $NO_x$ stored amount is above the second stored amount determination value (S505: YES), the process proceeds to S506. In this case, the PCM 60 sets the active $DeNO_x$ control execution flag to "1" to permit execution of the active $DeNO_x$ control (S506). In this manner, by executing the active DeNO$_x$ control after the engine start to somewhat forcibly reduce the NO$_x$ stored in the NO$_x$ catalyst 45, the NO$_x$ purification performance of the NO$_x$ catalyst 45 is reliably secured. On the other hand, when the NO$_x$ stored amount is smaller than the second stored amount determination value (S505: NO), the process proceeds to S509. In this case, the PCM 60 sets the active DeNO$_x$ control execution flag to "0" to prohibit unnecessary execution of the active DeNO$_x$ control (S509). Then, the process ends.

On the other hand, if the active DeNO$_x$ control has been executed after the engine start (S504: NO), the process proceeds to S507 where the PCM 60 determines whether the NO$_x$ stored amount acquired at S501 is above a third stored amount determination value (a value larger than the second stored amount determination value). For example, the third stored amount determination value is set to a value close to the limit value of the NO$_x$ stored amount. If the NO$_x$ stored amount is above the third stored amount determination value (S507: YES), the process proceeds to S508. On the other hand, if the NO$_x$ stored amount is smaller than the third stored amount determination value (S507: NO), the process proceeds to S509. In this case, the PCM 60 sets the active DeNO$_x$ control execution flag to "0" to prohibit unnecessary execution of the active DeNO$_x$ control (S509). Then, the process ends.

At S508, the PCM 60 determines whether a traveling distance of the vehicle from the previous execution time point of the active DeNO$_x$ control is longer than a given determination distance. If this traveling distance is longer than the determination distance (S508: YES), the process proceeds to S506. In this case, the PCM 60 sets the active DeNO$_x$ control execution flag to "1" to permit execution of the active DeNO$_x$ control (S506). By doing so, the active DeNO$_x$ control is executed to forcibly reduce a large amount of NO$_x$ stored in the NO$_x$ catalyst 45, thus the NO$_x$ purification performance of the NO$_x$ catalyst 45 is reliably secured. On the other hand, if the traveling distance is less than the determination distance (S508: NO), the process proceeds to S509. In this case, the PCM 60 sets the active DeNO$_x$ control execution flag to "0" to prohibit execution of the active DeNO$_x$ control (S509). Then, the process ends.

When the active DeNO$_x$ control is executed in a situation where the traveling distance from the previous execution time point of the active DeNO$_x$ control is short (i.e., the execution interval of the active DeNO$_x$ control is short), the possibility of the oil dilution due to the post injection occurring becomes high. Therefore, in this embodiment, when this traveling distance is shorter than the determination distance (S508: NO), execution of the active DeNO$_x$ control is prohibited and the oil dilution due to the post injection in the active DeNO$_x$ control is prevented. On the other hand, if the traveling distance from the previous execution time point of the active DeNO$_x$ control is long (i.e., the execution interval of the active DeNO$_x$ control is long), even if the active DeNO$_x$ control is to be executed, the possibility of the oil dilution occurring due to the post injection is low. Therefore, in this embodiment, when the traveling distance from the previous execution time point of the active DeNO$_x$ control is longer than the determination distance (S508: YES), execution of the active DeNO$_x$ control is permitted.

Next, the active DeNO$_x$ control of this embodiment executed based on the active DeNO$_x$ control execution flag set as described above is described with reference to the flowchart (active DeNO$_x$ control process) of FIG. 8. The PCM 60 repeatedly executes this active DeNO$_x$ control process at a given cycle in parallel with the fuel injection control, the DeNO$_x$ post injection amount calculation, and the active DeNO$_x$ control execution flag setting process illustrated in FIG. 7.

In the active DeNO$_x$ control process of this embodiment, the control of the glow plug 21 (glow control) and the control of the EGR gas (EGR control) are executed in parallel with the fuel injection control in the active DeNO$_x$ control (the fuel injection control for performing the post injection so as to control the air-fuel ratio to the target air-fuel ratio). The glow control is executed to energize the glow plug 21 in the active DeNO$_x$ control so as to improve the ignitability of the post-injected fuel in the active DeNO$_x$ control by the heat of the glow plug 21. The EGR control is executed to recirculate a suitable amount of EGR gas in the active DeNO$_x$ control so as to delay the ignition of the post-injected fuel, so that the combustion stability of the post-injected fuel is secured and smoke generation is prevented. In this embodiment, the fuel injection control in the active DeNO$_x$ control is started after the state of the glow plug 21 and the state of the EGR gas are stabilized by the glow control and the EGR control, respectively. Note that the glow control and the EGR control of this embodiment are described later in detail.

Figure 8:
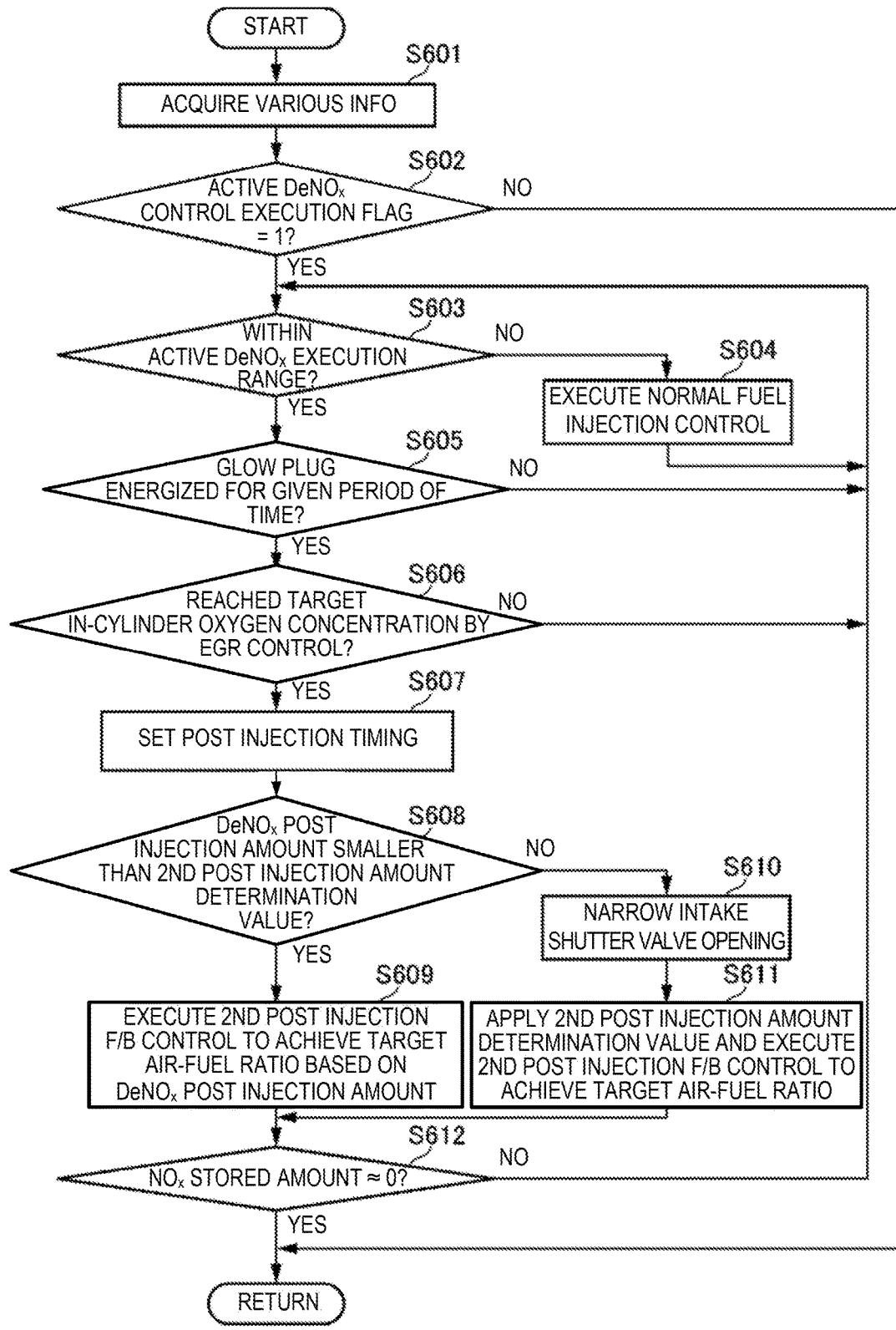
FIG. 8 is a flowchart illustrating the active $DeNO_x$ control of the embodiment.

The active DeNO$_x$ control process in FIG. 8 is described in detail. First, at S601, the PCM 60 acquires various information of the vehicle. For example, the PCM 60 at least acquires the engine load, the engine speed, the NO$_x$ catalyst temperature, the DeNO$_x$ post injection amount calculated in the DeNO$_x$ post injection amount calculation, and the value of the active DeNO$_x$ control execution flag set in the active DeNO$_x$ control execution flag setting process illustrated in FIG. 7. In addition, the PCM 60 acquires an oxygen concentration inside the cylinder (in-cylinder oxygen concentration) obtained by estimation (the method of this estimation is described later in detail).

Next, at S602, the PCM 60 determines whether the active DeNO$_x$ control execution flag acquired at S601 is "1." In other words, the PCM 60 determines whether the active DeNO$_x$ control is to be executed. If the active DeNO$_x$ control execution flag is "1" (S602: YES), the process proceeds to S603. On the other hand, if the active DeNO$_x$ control execution flag is "0" (S602: NO), the process is terminated without executing the active DeNO$_x$ control.

At S603, the PCM 60 determines whether the operating state of the engine (engine load and engine speed) is within the active DeNO$_x$ execution range R12 (see FIG. 4). Here, if the NO$_x$ catalyst temperature is above a given temperature and/or if the NO$_x$ stored amount is above a given amount, the PCM 60 may expand the active DeNO$_x$ execution range R12 to the higher load side and the higher speed side. If the operating state of the engine is within the active DeNO$_x$ execution range R12 (S603: YES), the process proceeds to S605. On the other hand, if the operating state of the engine is outside the active DeNO$_x$ execution range R12 (S603: NO), the process proceeds to S604.

At S604, without executing the active DeNO$_x$ control, i.e., without executing the fuel injection control which includes the post injection, the PCM 60 executes a normal fuel injection control which does not include the post injection for controlling the air-fuel ratio to the target air-fuel ratio. Typically, the PCM 60 only executes the control for causing the main injection with the fuel injection amount corresponding to the target torque. The PCM 60 actually executes the processing of S604 in the fuel injection control described above. Then, the process returns to S603 to perform the determination again. In other words, if the active DeNO$_x$ control execution flag is "1," the PCM 60 executes the normal fuel injection control while the operating state of the engine remains outside the active DeNO$_x$ execution range R12, but when the operation state enters the active DeNO$_x$ execution range R12, the PCM 60 switches the control from the normal fuel injection control to the fuel injection control in the active DeNO$_x$ control. For example, when the operating state of the engine deviates from the active DeNO$_x$ execution range R12 during the fuel injection control in the active DeNO$_x$ control, the PCM 60 suspends the fuel injection control and executes the normal fuel injection control. Then, when the operating state enters the active DeNO$_x$ execution range R12, the PCM 60 resumes the fuel injection control in the active DeNO$_x$ control.

Next, at S605, the PCM 60 determines whether the glow plug 21 has been energized by the glow control for over a given period of time, i.e., whether the energizing time of the glow plug 21 has reached the given time period, so as to determine whether the energized glow plug 21 has become stable. The given time period used at S605 is set based on the energizing time required for the glow plug 21 to reach a desired temperature, for example. If the energizing time of the glow plug 21 has reached the given time period (S605: YES), the process proceeds to S606. On the other hand, if the energizing time of the glow plug 21 has not reached the given time period (S605: NO), the process returns to S603. In this case, the PCM 60 waits until the energizing time of the glow plug 21 reaches the given time period.

At S606, the PCM 60 determines whether the estimated in-cylinder oxygen concentration has substantially reached a target in-cylinder oxygen concentration for the fuel injection control (including the post injection) in the active DeNO$_x$ control by the EGR control. For example, the PCM 60 determines whether a difference (absolute value) between the in-cylinder oxygen concentration and the target in-cylinder oxygen concentration is below a given value. At S606, whether the amount of EGR gas introduced by the EGR control is stable, in other words, whether a desired flow rate of EGR gas is introduced is determined. If the in-cylinder oxygen concentration has substantially reached the target in-cylinder oxygen concentration by the EGR control (S606: YES), the process proceeds to S607. On the other hand, if the in-cylinder oxygen concentration has not reached the target in-cylinder oxygen concentration (S606: NO), the process returns to S603. In this case, the PCM 60 waits until the in-cylinder oxygen concentration substantially reaches the target in-cylinder oxygen concentration by the EGR control.

At S607, the PCM 60 sets the post injection timing to be applied in the active DeNO$_x$ control. The method of this setting is described in detail.

As described above, in this embodiment, when executing the active DeNO$_x$ control, the air-fuel ratio is controlled to the target air-fuel ratio by combusting the post-injected fuel inside the cylinder. To combust the post-injected fuel inside the cylinder, the post injection may be performed at a comparatively advanced timing on the expansion stroke. However, if the post injection timing is excessively advanced, ignition occurs before air and fuel are suitably mixed, and smoke is generated. Therefore, in this embodiment, the post injection timing is suitably set on the advance side, specifically, a suitable timing in the early half of the expansion stroke is adopted as the post injection timing of the active DeNO$_x$ control, and a suitable amount of EGR gas is introduced in the active DeNO$_x$ control. Thus, the ignition of post-injected fuel is delayed to prevent the generation of smoke, etc. In this embodiment, the post injection timing at least in the early half of the expansion stroke is retarded as the engine load becomes higher. This is because, since the fuel injection amount increases and the smoke becomes easier to be generated as the engine load increases, the post injection timing is retarded as much as possible. In this case, if the post injection timing is excessively retarded, the post-injected fuel becomes easier to be combusted (misfire) and HC is generated. Therefore, in this embodiment, the post injection timing is suitably retarded.

Further, in this embodiment, the post injection timing is advanced, i.e., the retarding amount of the post injection timing is reduced, as the engine speed becomes higher. When the engine speed is high, if the fuel is injected at the same crank angle as when the engine speed is low, since misfire may occur due to the short period of time for the fuel to ignite, in this embodiment, the post injection timing is advanced as the engine speed increases so as to secure the combustion stability.

At S608, the PCM 60 determines whether the DeNO$_x$ post injection amount acquired at S601 is smaller than the second post injection amount determination value. The second post injection amount determination value is set larger than the first post injection amount determination value used in the passive DeNO$_x$ control (see S307 in FIG. 5). Thus, it is possible to achieve a larger post injection amount in the active DeNO$_x$ control than in the passive DeNO$_x$ control, and the air-fuel ratio becomes controllable to the target air-fuel ratio regardless of the operating state of the engine E (e.g., even if it is not in a state where the air-fuel ratio reduces, such as during acceleration).

If the DeNO$_x$ post injection amount is smaller than the second post injection amount determination value (S608: YES), the process proceeds to S609 where the PCM 60 controls the fuel injector 20 to inject the DeNO$_x$ post injection amount acquired at S601 at the post injection timing set at S607, and controls the air-fuel ratio to the target air-fuel ratio so as to reduce NO$_x$ stored in the NO$_x$ catalyst 45. For example, due to variations in detections of various sensors, variations in the fuel injection amount of the fuel injector 20, etc., based on the air-fuel ratio corresponding to the detection value of the O$_2$ sensor 111 disposed in the exhaust passage 41 (actual air-fuel ratio) and the target air-fuel ratio, the PCM 60 executes a F/B (feedback) control of the post injection amount injected from the fuel injector 20 so as to match the actual air-fuel ratio with the target air-fuel ratio. Hereinafter, the F/B control of the post injection amount executed in the active DeNO$_x$ control is suitably referred to as "second post injection F/B control." Although in this second post injection F/B control, an F/F control (feed-forward control) is executed in addition to the F/B control, since the F/B control is mainly executed, the term "F/B control" is used for the sake of convenience.

More specifically, the PCM 60 first sets a comparatively large air-fuel ratio (comparatively less rich air-fuel ratio) as a target value, and executes the F/F control of the post injection amount from the fuel injector 20. Then the PCM 60 executes the F/B control of the post injection amount from the fuel injector 20 by using a comparatively small F/B gain based on the actual air-fuel ratio and the target air-fuel ratio. In this manner, the actual air-fuel ratio is gently changed toward the target air-fuel ratio in the active DeNO$_x$ control so as to prevent the actual air-fuel ratio from becoming richer than the target air-fuel ratio, i.e., the actual air-fuel ratio undershoots the target air-fuel ratio.

Note that the PCM 60 actually performs the processing of S609 in the fuel injection control.

On the other hand, if the DeNO$_x$ post injection amount is above the second post injection amount determination value (S608: NO), the process proceeds to S610. At S610, the PCM 60 reduces the oxygen concentration of air introduced into the engine E so as to control the air-fuel ratio to the target air-fuel ratio by using the post injection amount which is below the second post injection amount determination value (specifically, the second post injection amount determination value itself is applied as the $DeNO_x$ post injection amount). In this case, the PCM 60 executes at least one of a control for narrowing the opening of the intake shutter valve 7, a control for increasing the EGR gas amount, and a control for lowering the turbocharging pressure by the turbocharger 5, so as to reduce the oxygen concentration of the air introduced into the engine E, i.e., reduce the charging amount. For example, the PCM 60 obtains the turbocharging pressure required for controlling the air-fuel ratio to the target air-fuel ratio by using the $DeNO_x$ post injection amount to which the second post injection amount determination value is applied. The PCM 60 reduces the opening of the intake shutter valve 7 to be a desired opening based on the actual turbocharging pressure (the pressure detected by the pressure sensor 108) and the EGR gas amount so as to achieve this turbocharging pressure. Then, the process proceeds to S611.

Note that the intake shutter valve 7 is fully opened in the normal operating state of the engine E, whereas during $DeNO_x$, DPF regeneration, idle operation, etc., the opening of the intake shutter valve 7 is typically a given basic opening. In the operating state where the EGR gas is not introduced, the intake shutter valve 7 is feedback-controlled based on the turbocharging pressure.

Next, at S611, the PCM 60 applies the second post injection amount determination value to the $DeNO_x$ post injection amount, i.e., sets the $DeNO_x$ post injection amount to be the second post injection amount determination value. Moreover, the PCM 60 controls the fuel injector 20 to inject this $DeNO_x$ post fuel injection amount at the post injection timing set at S607, so as to control the air-fuel ratio to the target air-fuel ratio and reduce the $NO_x$ stored in the $NO_x$ catalyst 45. For example, similar to S609, the PCM 60 performs the second post injection F/B control. That is, the PCM 60 first sets a comparatively large air-fuel ratio (comparatively less rich air-fuel ratio) as a target value, and executes the F/F control of the post injection amount from the fuel injector 20. Then the PCM 60 executes the F/B control of the post injection amount injected from the fuel injector 20 by using a comparatively small F/B gain based on the actual air-fuel ratio and the target air-fuel ratio. Note that the PCM 60 actually performs the processing of S611 in the fuel injection control.

After S609 or S611, the process proceeds to S612 where the PCM 60 determines whether the $NO_x$ stored amount in the $NO_x$ catalyst 45 is substantially zero. For example, the PCM 60 determines that the $NO_x$ stored amount is substantially zero when the $NO_x$ stored amount estimated based on the operating state of the engine E, the flow rate of the exhaust gas, the temperature of the exhaust gas, etc. becomes substantially zero and the detection value of the $NO_x$ sensor 116 disposed immediately downstream of the DPF 46 changes (S612: YES). Then the process ends. Here, the PCM 60 ends the active $DeNO_x$ control. The PCM 60 further resets the $NO_x$ stored amount used in the active $DeNO_x$ control process and the active $DeNO_x$ control execution flag setting process in FIG. 7 to zero.

On the other hand, when the $NO_x$ stored amount is not substantially zero (S612: NO), the process returns to S603. In this case, the PCM 60 continues the active $DeNO_x$ control. In other words, the PCM 60 continues the active $DeNO_x$ control until the $NO_x$ stored amount becomes almost zero. Particularly, even if the execution condition of the active $DeNO_x$ control (e.g., the condition of S603) is not satisfied during the active $DeNO_x$ control and the active $DeNO_x$ control is suspended, when the execution condition of the active $DeNO_x$ control is satisfied thereafter, the PCM 60 promptly resumes the active $DeNO_x$ control to bring the $NO_x$ stored amount to substantially zero.

Here, the $NO_x$ stored amount is determinable as substantially zero based on the detection value of the $NO_x$ sensor 116 because of the following reason. Since the $NO_x$ sensor 116 also functions as an oxygen concentration sensor, the detection value of the $NO_x$ sensor 116 corresponds to the air-fuel ratio reaches the $NO_x$ sensor 116. While the $NO_x$ catalyst 45 performs reduction, i.e., when the $NO_x$ stored amount is not zero, oxygen generated by reducing $NO_x$ reaches the $NO_x$ sensor 116. On the other hand, when the $NO_x$ stored amount becomes substantially zero, such oxygen generated by reduction is no longer reaches the $NO_x$ sensor 116. Therefore, at the timing when the $NO_x$ stored amount becomes substantially zero, the air-fuel ratio reached the $NO_x$ sensor 116 reduces, thus the detection value of the $NO_x$ sensor 116 changes.

Note that the second post injection amount determination value used in the active $DeNO_x$ control process is not limited to a fixed value, and may be changed according to the in-cylinder temperature. For example, similar to the first post injection amount determination value described above, in consideration of progression in vaporization of post-injected fuel and oil dilution being less likely to occur as the in-cylinder temperature rises, the second post injection amount determination value may be increased as the in-cylinder temperature rises.

<Glow Control>

Figure 9:
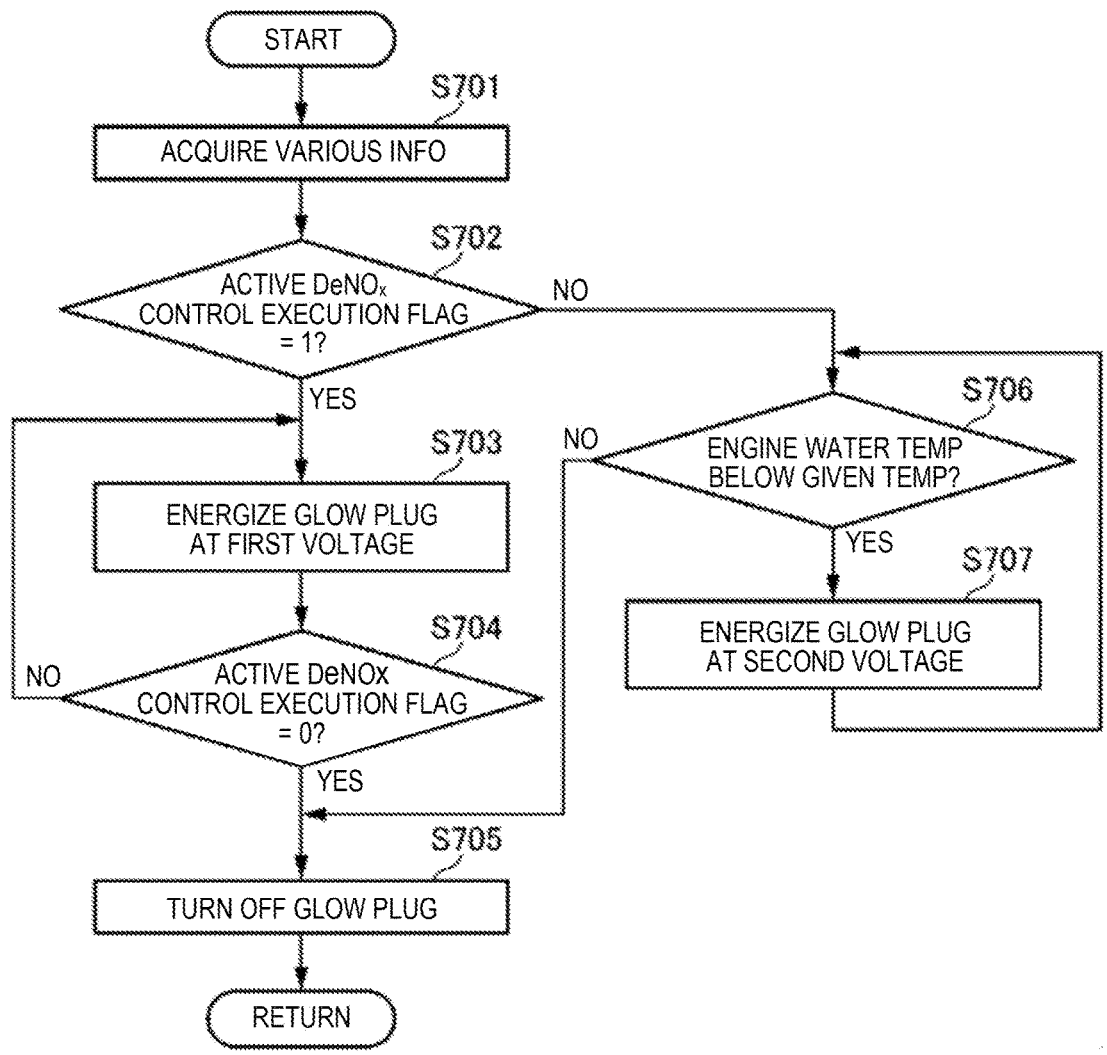
FIG. 9 is a flowchart illustrating a glow control of the embodiment.

Next, the glow control of this embodiment is described with reference to the flowchart (glow control process) illustrated in FIG. 9. The PCM 60 repeatedly executes this glow control process at a given cycle in parallel with the various control processes described above (particularly, the active $DeNO_x$ control process). In this embodiment, as described above, the glow control is executed to energize the glow plug 21 in the active $DeNO_x$ control to improve the ignitability of the post-injected fuel in the active $DeNO_x$ control by the heat of the glow plug 21. Note that in this embodiment, during the passive $DeNO_x$ control, since the post-injected fuel is not combusted, i.e., there is no need to improve the ignitability of the post-injected fuel, the glow plug 21 is not energized.

First, at S701, the PCM 60 acquires various information of the vehicle. For example, the PCM 60 at least acquires the engine water temperature and the value of the active $DeNO_x$ control execution flag set in the active $DeNO_x$ control execution flag setting process illustrated in FIG. 7.

Next, at S702, the PCM 60 determines whether the active $DeNO_x$ control execution flag obtained at S701 is "1." If the active $DeNO_x$ control execution flag is "1" (S702: YES), the process proceeds to S703. In this case, the PCM 60 energizes the glow plug 21 so as to improve the ignitability of the post-injected fuel in the active $DeNO_x$ control by the heat of the glow plug 21 (S703). For example, the PCM 60 energizes the glow plug 21 at a first voltage (e.g., about 7V), i.e., applies the first voltage to the glow plug 21 as an energizing voltage. This first voltage is set smaller than an energizing voltage applied to the glow plug 21 when the engine E is in a cold state (second voltage described later). Then, the process proceeds to S704.

At S704, the PCM 60 determines whether the active DeNO$_x$ control execution flag is "0." If the active DeNO$_x$ control execution flag is "0" (S704: YES), the process proceeds to S705 where the PCM 60 ends the energization of the glow plug 21, i.e., turns off the glow plug 21. For example, the PCM 60 sets the energizing voltage applied to the glow plug 21 to 0V. Then, the process ends. On the other hand, if the active DeNO$_x$ control execution flag is not "0" (S704: NO), the process returns to S703. In this case, the PCM 60 continues applying the first voltage to the glow plug 21. In other words, the PCM 60 continues energizing the glow plug 21 as long as the active DeNO$_x$ control is executed.

On the other hand, if the active DeNO$_x$ control execution flag is determined as "0" (S702: NO), the process proceeds to S706. In this case, the PCM 60 determines whether the engine water temperature is below a given temperature (e.g., 40° C.) (S706). In other words, the engine E is in the cold state is determined. If the engine water temperature is above the given temperature (S706: NO), the process proceeds to S705. In this case, the PCM 60 turns off the glow plug 21 and does not energize the glow plug 21.

On the other hand, if the engine water temperature is lower than the given temperature (S706: YES), the process proceeds to S707. In this case, the PCM 60 energizes the glow plug 21 so as to improve the ignitability of the main-injected fuel in the cold state (S707). For example, the PCM 60 energizes the glow plug 21 at the second voltage (e.g., about 10V), in other words, applies the second voltage to the glow plug 21 as a conduction voltage. Then, the process returns to S706 to perform the determination of the engine water temperature again. In other words, the PCM 60 continues applying the second voltage to the glow plug 21 until the engine water temperature becomes above the given temperature.

Note that the first voltage applied to the glow plug 21 during the active DeNO$_x$ control is set smaller than the second voltage applied to the glow plug 21 when the engine E is in the cold state. In this case, during the active DeNO$_x$ control, the temperature of the glow plug 21 becomes lower than in the cold state. For example, the temperature of the glow plug 21 is about 800° C. in the active DeNO$_x$ control, and is about 1200° C. in the cold state. The voltage applied to the glow plug 21 during the active DeNO$_x$ control is made smaller than in the cold state because the fuel amount of the post injection for securing the ignitability during the active DeNO$_x$ control is smaller than the fuel amount of the main injection for securing the ignitability in the cold state of the engine E. In other words, when securing the ignitability of the post-injected fuel, the temperature of the glow plug 21 is not required to be increased as much as when securing the ignitability of the main-injected fuel. Therefore, in this embodiment, the power of the glow plug 21 is saved by making the voltage applied to the glow plug 21 lower during the active DeNO$_x$ control than in the cold state.

Note that although in the above embodiment the voltage (energizing voltage) applied to the glow plug 21 is controlled, alternatively, the current (energized current) or power (energized power) applied to the glow plug 21 may be controlled. Also in such a case, a current or electric power smaller than in the cold state may be applied during the active DeNO$_x$ control.

<EGR Control>

Figure 10:
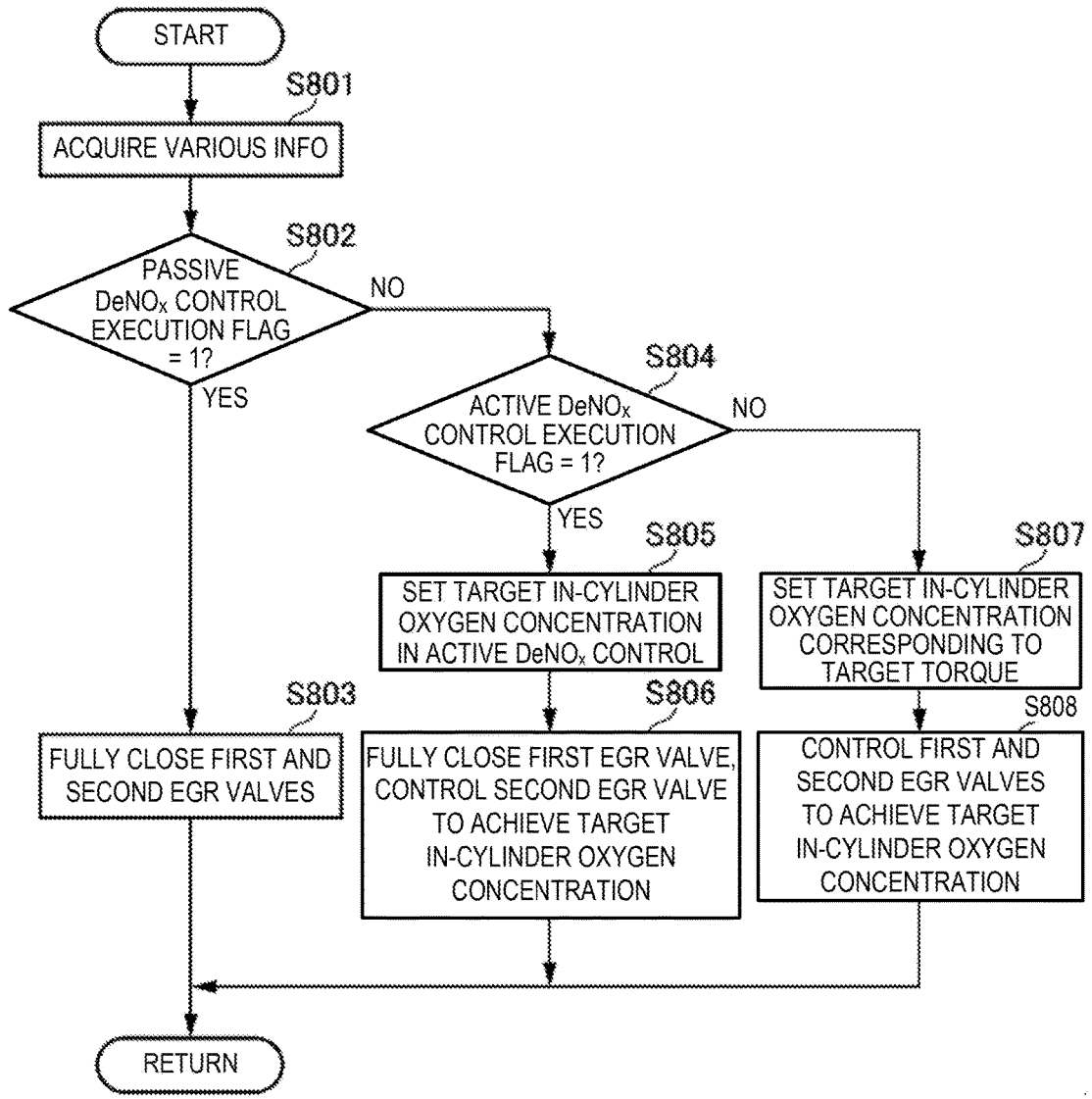
FIG. 10 is a flowchart illustrating an EGR control of the embodiment.

Next, the EGR control of this embodiment is described with reference to the flowchart (EGR control process) illustrated in FIG. 10. The PCM 60 repeatedly executes this EGR control process at a given cycle in parallel with the various control processes described above (particularly, active DeNO$_x$ control process, glow control process, etc.).

First, at S801, the PCM 60 acquires various information of the vehicle. For example, the PCM 60 at least acquires the target torque determined in the fuel injection control, the value of the passive DeNO$_x$ control execution flag set in the passive DeNO$_x$ control execution flag setting process illustrated in FIG. 5, and the value of the active DeNO$_x$ control execution flag set in the active DeNO$_x$ control execution flag setting process illustrated in FIG. 7. In addition, the PCM 60 acquires the estimated in-cylinder oxygen concentration (the estimating method of the in-cylinder oxygen concentration is described later in detail).

Next, at S802, the PCM 60 determines whether the passive DeNO$_x$ control execution flag obtained at S801 is "1." If the passive DeNO$_x$ control execution flag is "1" (S802: YES), i.e., if the passive DeNO$_x$ control is to be executed, the process proceeds to S803. In this case, the PCM 60 fully closes both the first EGR valve 43c disposed in the EGR passage 43a and the second EGR valve 43e disposed in the EGR cooler bypass passage 43d for bypassing the EGR cooler 43b (S803). In other words, when executing the passive DeNO$_x$ control, the PCM 60 prohibits the recirculation of the EGR gas to the intake system IN. This is because in the passive DeNO$_x$ control, when the EGR gas is recirculated, unburned fuel (HC) is also recirculated due to the post-injected fuel being discharged as unburned fuel, and thus there is a possibility that the deposit caused by this HC blocks the gas passage (EGR passages 43a and 43d, intake passage 1, etc.).

On the other hand, if the passive DeNO$_x$ control execution flag is "0" (S802: NO), the process proceeds to S804. At S804, the PCM 60 determines whether the active DeNOx control execution flag acquired at S801 is "1." If the active DeNO$_x$ control execution flag is "1" (S804: YES), i.e., if the active DeNO$_x$ control is to be executed, the process proceeds to S805. In this case, the PCM 60 sets the target in-cylinder oxygen concentration to be applied in the active DeNO$_x$ control (S805). For example, the PCM 60 sets the target in-cylinder oxygen concentration to be applied in the active DeNO$_x$ control, so that introduction of EGR gas in the active DeNO$_x$ control reduces the generation of smoke etc. when the post-injected fuel is combusted, while securing the combustion stability of the post-injected fuel. Moreover, as is described later, since the EGR gas bypasses the EGR cooler 43b in the active DeNO$_x$ control, the temperature of the EGR gas becomes relatively high and it becomes difficult to take in the EGR gas. Therefore, the PCM 60 sets the target in-cylinder oxygen concentration to a larger value than in the case where the DeNO$_x$ control is not executed. For example, the value to be applied as the target in-cylinder oxygen concentration may be set in advance according to the operating state of the engine E.

Next, at S806, the PCM 60 fully closes the first EGR valve 43c disposed in the EGR passage 43a, controls the opening of the second EGR valve 43e disposed in the EGR cooler bypass passage 43d so as to achieve the target in-cylinder oxygen concentration set at S805. For example, the PCM 60 controls the opening of the second EGR valve 43e based on the estimated in-cylinder oxygen concentration and the target in-cylinder oxygen concentration. In this manner, when executing the active DeNO$_x$ control, the PCM 60 recirculates the EGR gas to the intake system IN via the EGR cooler bypass passage 43d. In this manner, a suitable amount of EGR gas is recirculated during the active DeNO$_x$ control and the ignition of the post-injected fuel is delayed, so as to secure the combustion stability of the post-injected fuel and reduce the smoke generation. The EGR gas is recirculated through the EGR cooler bypass passage 43*d* instead of the EGR passage 43*a*, i.e., without passing through the EGR cooler 43*b*, in order to prevent that HC generated by the post injection in the active DeNO$_x$ control is taken in as the EGR gas and cooled by the EGR cooler 43*b*, and the deposit blocks the EGR cooler 43*b*.

The PCM 60 typically controls the opening of the second EGR valve 43*e* when the active DeNO$_x$ control is executed so that the EGR gas amount becomes smaller than when the active DeNO$_x$ control is not executed (i.e., in the normal operation of the engine E), under the same operating state of the engine E. This is because, during the DeNO$_x$ control, a large amount of EGR gas is not required to be introduced since NO$_x$ is uneasily generated in the combustion. Additionally, it is because if a large amount of EGR gas is introduced, the post-injected fuel in the active DeNO$_x$ control is not properly combusted (misfire) and HC is generated.

On the other hand, if the active DeNO$_x$ control execution flag is "0" (S804: NO), the process proceeds to S807. In this case, since the PCM 60 does not execute the passive DeNO$_x$ control nor the active DeNO$_x$ control, it sets the target in-cylinder oxygen concentration applied in the case of introducing the EGR gas in the normal operation of the engine E (S807). For example, the PCM 60 sets the target in-cylinder oxygen concentration to be applied corresponding to the target torque so as to control the in-cylinder temperature and secure the combustion stability by the introduction of EGR gas. The value to be applied as the target in-cylinder oxygen concentration may be set in advance according to the operating state of the engine E.

Next, at S808, the PCM 60 controls both the openings of the first EGR valve 43*c* disposed in the EGR passage 43*a* and the second EGR valve 43*e* disposed in the EGR cooler bypass passage 43*d* so as to achieve the target in-cylinder oxygen concentration set at S807. For example, the PCM 60 controls both the openings of the first EGR valve 43*c* and the second EGR valve 43*e* based on the estimated in-cylinder oxygen concentration and target in-cylinder oxygen concentration. A map defining the openings of the first EGR valve 43*c* and the second EGR valve 43*e* to be set according to the target in-cylinder oxygen concentration may be prepared in advance, and the PCM 60 may set the openings of the first EGR valve 43*c* and the second EGR valve 43*e* by referring to the map.

<In-Cylinder Oxygen Concentration Estimation>

Next, the method of estimating the in-cylinder oxygen concentration of this embodiment is described.

In this embodiment, the PCM 60 estimates the in-cylinder oxygen concentration by the following procedure in consideration of a transport delay of gas in the intake and exhaust systems. First, the PCM 60 obtains the exhaust gas oxygen concentration based on the in-cylinder oxygen concentration estimated previously (the in-cylinder oxygen concentration is typically obtained by the FB calculation), an in-cylinder gas amount obtained by a statistical model when the EGR gas is not introduced, the fuel injection amount, and the oxygen consumption rate in the cylinder. For example, the PCM 60 calculates "(in-cylinder oxygen concentration×in-cylinder gas amount−oxygen consumption rate×fuel injection amount)/(in-cylinder gas amount+fuel injection amount)." Further, in this case, the PCM 60 calculates the exhaust gas oxygen concentration by taking into consideration of the delay of about two strokes in the engine E and the learning result of the exhaust gas oxygen concentration.

Next, the PCM 60 calculates an oxygen concentration within EGR gas (EGR gas oxygen concentration) based on the exhaust gas oxygen concentration obtained as described above, in consideration of the transport delay of gas in the EGR passage 43*a* (including the EGR cooler bypass passage 43*d*). The PCM 60 obtains an oxygen concentration within gas passing through an intake port of the engine E (intake-port oxygen concentration) based on the EGR gas oxygen concentration, the EGR gas amount, a gas amount passing through the intake shutter valve (intake-shutter gas amount) obtained by another model (described later), and an oxygen concentration within gas passing through the intake shutter valve (intake-shutter oxygen concentration). For example, the PCM 60 calculates "(EGR gas oxygen concentration× EGR gas amount−intake-shutter oxygen concentration×intake-shutter gas amount)/(EGR gas amount+intake-shutter gas amount)." In this case, the PCM 60 calculates the intake-port oxygen concentration in consideration of the transport delay of gas in the intake manifold of the engine E.

Next, the PCM 60 estimates the in-cylinder oxygen concentration based on the intake-port oxygen concentration obtained as described above, the intake-port gas amount, an internal EGR gas amount, and an internal EGR gas oxygen concentration corresponding to the exhaust gas oxygen concentration obtained as described above. For example, the PCM 60 calculates "(intake port oxygen concentration× intake port gas amount−internal EGR gas oxygen concentration×internal EGR gas amount)/(intake port gas amount+ internal EGR gas amount)."

Here, the PCM 60 estimates the intake shutter valve gas amount by the following procedure. First, the PCM 60 obtains the intake port gas amount by subtracting the internal EGR gas amount from the in-cylinder gas amount obtained by the statistical model when the EGR gas is not introduced. In parallel with this calculation, the PCM 60 obtains a corrected airflow rate by subtracting from the flow rate (airflow rate) detected by the airflow sensor 101 a correction amount of the airflow rate taking into consideration a transition state of the engine operation.

Next, the PCM 60 obtains the EGR gas amount by subtracting the corrected airflow rate from the intake port gas amount obtained as described above. Then, the PCM 60 obtains the intake shutter valve gas amount by subtracting the EGR gas amount from the intake port gas amount obtained as described above. Note that when the EGR gas is not introduced (i.e., when the first EGR valve 43*c* and the second EGR valve 43*e* are fully closed), the PCM 60 obtains the intake port gas amount as the intake shutter valve gas amount as it is.

<Control Example>

Next, a specific example of the active DeNO$_x$ control of this embodiment described with reference to FIG. 11 which shows time charts illustrating changes in various parameters when executing the active DeNO$_x$ control.

Figure 11:
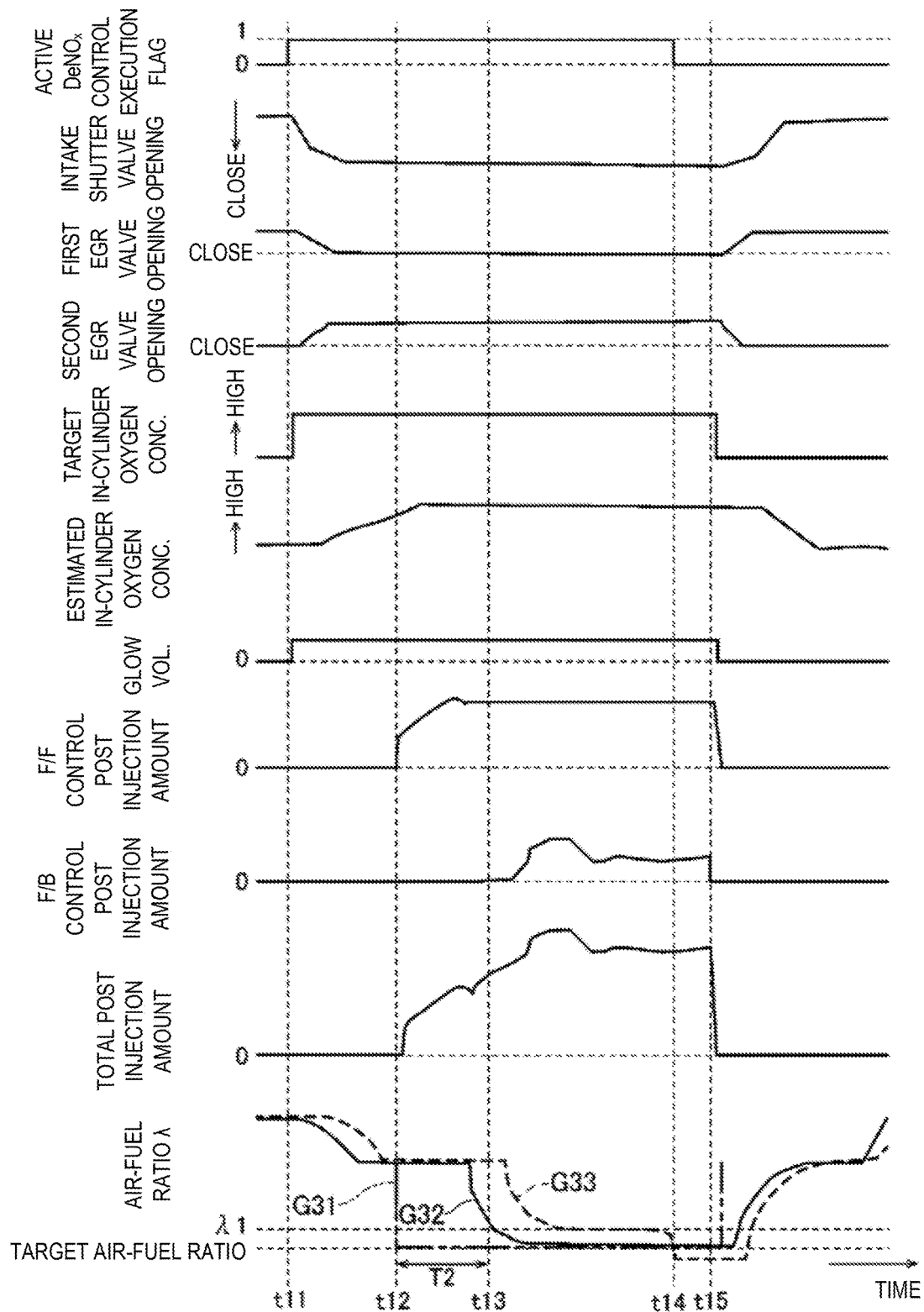
FIG. 11 shows time charts illustrating changes in various parameters when performing the active $DeNO_x$ control of the embodiment.

FIG. 11 shows, from the top, the active DeNO$_x$ control execution flag, the opening of the intake shutter valve 7, the opening of the first EGR valve 43*c*, the opening of the second EGR valve 43*e*, the target in-cylinder oxygen concentration, the in-cylinder oxygen concentration estimated by the above method, the energizing voltage (glow voltage) of the glow plug 21, the post injection amount set by the F/F control during the second post injection F/B control, the post injection amount set by the F/B control during the second post injection F/B control, a total post injection amount of these two post injection amounts, and the air-fuel ratio (λ). Further in FIG. 11, the reference character λ1 indicates the theoretical air-fuel ratio, the graph G31 indicates the target air-fuel ratio, and the graph G32 indicates the actual air-fuel ratio corresponding to the detection value of the O$_2$ sensor 111 disposed upstream of the $NO_x$ catalyst 45, and the graph G33 indicates the actual air-fuel ratio corresponding to the detection value of the $NO_x$ sensor 116 disposed downstream of the $NO_x$ catalyst 45.

First, at a timing t11, the active $DeNO_x$ control execution flag is switched from "0" to "1," and the PCM 60 starts the active $DeNO_x$ control. For example, the PCM 60 executes the EGR control from the timing t11. In this case, the PCM 60 sets the target in-cylinder oxygen concentration for the active $DeNO_x$ control (e.g., increases the target in-cylinder oxygen concentration), fully closes the first EGR valve 43c, and then controls the opening of the second EGR valve 43e to achieve the target in-cylinder oxygen concentration based on the estimated in-cylinder oxygen concentration. Further, the PCM 60 energizes the glow plug 21 (glow control) from the timing t11. For example, the PCM 60 applies the first voltage to the glow plug 21. In addition, the PCM 60 narrows the opening of the intake shutter valve 7 so as to reduce the charging amount of the engine E at the timing t11.

Then at timing t12, the state of the glow plug 21 and the state of the EGR gas becomes stable by the glow control and the EGR control, respectively. For example, at timing t12, the condition of the difference (absolute value) between the target in-cylinder oxygen concentration and the in-cylinder oxygen concentration becoming lower than the given value by the EGR control and the condition of the energizing time of the glow plug 21 reaching the given time are satisfied. At this timing t12, the PCM 60 starts controlling the fuel injector 20 to perform the post injection so that the actual air-fuel ratio is controlled to the target air-fuel ratio. For example, the PCM 60 starts the second post injection F/B control of the post injection amount. In this case, the PCM 60 first sets the comparatively less rich air-fuel ratio as the target value (not illustrated) and starts the F/F control of the post injection amount.

At timing t13, a period of time T2 corresponding to the response delay of the $O_2$ sensor 111 passed from the start of the F/F control of the post injection amount. The response delay of the $O_2$ sensor 111 is caused by a transport delay of gas from the exhaust port to the disposed position of the $O_2$ sensor 111 and exchange of gas inside the $O_2$ sensor 111. Then, from timing t13, the PCM 60 starts the F/B control of the post injection amount using the comparatively small F/B gain based on the actual air-fuel ratio and the target air-fuel ratio. In this case, the PCM 60 substantially fixes the post injection amount set by the F/F control and applies the total post injection amount of the post injection amount and the post injection amount by the F/B control.

By such control of the post injection amount, the actual air-fuel ratio corresponding to the detection value of the $O_2$ sensor 111 reaches the target air-fuel ratio after timing t13. Then, at timing t14, the $NO_x$ stored amount in the $NO_x$ catalyst 45 becomes substantially zero, so that the actual air-fuel ratio corresponding to the detection value of the $NO_x$ sensor 116 disposed downstream of the $NO_x$ catalyst 45 is enriched in the stepwise fashion. At this timing, the PCM 60 switches the active $DeNO_x$ control execution flag from "1" to "0." Then, at a timing t15 when a certain period of time has elapsed from the timing t14, the PCM 60 ends the active $DeNO_x$ control. For example, the PCM 60 increases the opening of the intake shutter valve 7, increases the opening of the first EGR valve 43c in the fully closed state, fully closes the second EGR valve 43e, turns off the glow plug 21, and suspends the post injection from the fuel injector 20.

<Operation and Effects>

Next, the operation and effects of the exhaust emission control system of the engine of this embodiment are described.

In this embodiment, under the same operating state of the engine E, the PCM 60 executes the EGR control when the active $DeNO_x$ control is executed so that the EGR gas amount becomes smaller than when it is not executed, and then starts the active $DeNO_x$ control once the EGR control is stabilized. Thus, it is possible to introduce a suitable amount of EGR gas during the active $DeNO_x$ control. As a result, the generation of smoke and HC due to combusting the post-injected fuel in the active $DeNO_x$ control is suitably reduced.

For example, by introducing a suitable amount of EGR gas in the active $DeNO_x$ control, the combustion stability degrading due to introduction of a large amount of EGR gas is prevented, i.e., the combustion stability is secured, the post-injected fuel is properly combusted, and generation of HC corresponding to unburned fuel is reduced. Further by introducing a suitable amount of EGR gas in the active $DeNO_x$ control, ignition of post-injected fuel is delayed to cause ignition in a state where air and fuel are suitably mixed, and generation of smoke due to combustion of the post-injected fuel is reduced.

According to this embodiment, in the case of executing the active $DeNO_x$ control, the active $DeNO_x$ control is started after the EGR gas amount introduced by the control of the second EGR valve 43e is determined to be stable, i.e., the desired amount of EGR gas is determined to have been supplied into the engine E. Thus, the generation of smoke and HC is reliably reduced. Especially in this embodiment, the stable state of the EGR gas amount is suitably determined based on the difference between the estimated in-cylinder oxygen concentration and the target in-cylinder oxygen concentration for the active $DeNO_x$ control.

Further according to this embodiment, the opening of the second EGR valve 43e is controlled based on the target in-cylinder oxygen concentration for the active $DeNO_x$ control. Therefore, the oxygen concentration inside the cylinder of the engine E is suitably set by introducing a desired amount of EGR gas into the engine E.

Further according to this embodiment, the EGR gas is recirculated via the EGR cooler bypass passage 43d instead of the EGR passage 43a during the active $DeNO_x$ control, i.e., the EGR gas is recirculated without passing through the EGR cooler 43b. Therefore, HC, etc. generated due to the post injection is prevented from being taken in as the EGR gas and cooled by the EGR cooler 43b to cause deposit to block the EGR cooler 43b.

Further according to this embodiment, in the passive $DeNO_x$ control, the recirculation of the EGR gas to the intake system IN is prohibited. Therefore, unburned fuel discharged in the passive $DeNO_x$ control is prevented from mixing with the EGR gas and recirculating to cause deposit produced thereby to block the gas passage.

<Modifications>

In the above embodiment, the permission/prohibition of the active $DeNO_x$ control is determined based on the travelling distance from the previous execution time point of the active $DeNO_x$ control. Alternatively, in one modification, the permission/prohibition of the active $DeNO_x$ control may be determined based on lapse time from the previous execution time point of the active $DeNO_x$ control. In other words, the active $DeNO_x$ control may be prohibited when the lapse time from the previous execution time point of the active $DeNO_x$ control is less than a given determination time. Also in this modification, the determination time may be set similarly to the determination distance. For example, the determination time may be set shorter as the in-cylinder temperature rises. Further, the engine water temperature or the intake air temperature may be used as an index reflecting the in-cylinder temperature, so that the determination time is set shorter as the engine water temperature rises or the intake air temperature rises.

As described above, even in the modification of determining the permission/prohibition of the active DeNO$_x$ control based on the lapse time from the previous execution time point of the active DeNO$_x$ control, the same effects as those described in the above "Operation and Effects" section are obtained. In other words, oil dilution due to the post-injected fuel in the active DeNO$_x$ control is suitably prevented.

In the above embodiment, execution of the passive DeNO$_x$ control is completely prohibited when the execution frequency of the passive DeNO$_x$ control is above the frequency determination value; however, it is not limited to this. Compared with when the execution frequency of the passive DeNO$_x$ control is less than the frequency determination value, execution of the passive DeNO$_x$ control may simply be limited when the execution frequency of the passive DeNO$_x$ control is above the frequency determination value. For example, when the execution frequency of the passive DeNO$_x$ control is above the frequency determination value, the number of times of performing the post injection may be reduced lower than when the execution frequency of the passive DeNO$_x$ control is less than the frequency determination value.

Similarly, when the traveling distance from the previous execution of the active DeNO$_x$ control is less than the determination distance, or when the lapse time from the previous execution of the active DeNO$_x$ control is less than the determination time, the execution of the active DeNO$_x$ control may suitably be limited without being completely prohibited.

Although in the above embodiment the recirculation of the EGR gas to the intake system IN is completely prohibited in the passive DeNO$_x$ control, within the extent that the deposit caused by the recirculation of the EGR gas does not block the passage, a small amount of EGR gas may be recirculated during the passive DeNO$_x$ control. In this case, at least in the passive DeNO$_x$ control, the EGR gas amount is preferably reduced smaller than in the active DeNO$_x$ control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
5 Turbocharger
7 Intake Shutter Valve
17 Combustion Chamber
20 Fuel Injector
41 Exhaust Passage
43 EGR Device
43a EGR Passage
43b EGR Cooler
43c First EGR Valve
43d EGR Cooler Bypass Passage
43e Second EGR Valve
45 NO$_x$ Catalyst
46 DPF
47 SCR Catalyst
60 PCM (controller)
111 O$_2$ Sensor
116 NO$_x$ Sensor
200 Engine System
E Engine
EX Exhaust System
IN Intake System

What is claimed is:

1. An exhaust emission control system of an engine, including a NO$_x$ catalyst disposed in an exhaust passage of the engine for storing NO$_x$ within exhaust gas when an air-fuel ratio of the exhaust gas is lean, and reducing the stored NO$_x$ when the air-fuel ratio is stoichiometric or rich, the exhaust emission control system comprising a processor configured to execute:

a NO$_x$ reduction controlling module for performing a NO$_x$ reduction control in which a fuel injector performs a post injection of fuel to control the air-fuel ratio to a target air-fuel ratio so that the stored NO$_x$ is reduced, the target air-fuel ratio being a ratio at which the stored NO$_x$ is reducible; and an exhaust gas recirculation (EGR) controlling module for controlling an EGR valve disposed in an EGR passage connected to the exhaust passage and an intake passage of the engine, to recirculate EGR gas from the exhaust passage to the intake passage at a flow rate according to an operating state of the engine, wherein when the NO$_x$ reduction controlling module performs the NO$_x$ reduction control, the EGR controlling module controls an opening of the EGR valve to a target opening smaller than the opening when the NO$_x$ reduction controlling module does not perform the NO$_x$ reduction control in the same operating state of the engine, the NO$_x$ reduction controlling module starts the NO$_x$ reduction control after the opening of the EGR valve is controlled to the target opening, the EGR passage includes a first EGR passage on which an EGR cooler is disposed, and a second EGR passage for flowing the EGR gas by bypassing the EGR cooler, the EGR valve includes a first EGR valve for adjusting the flow rate of the EGR gas flowing in the first EGR passage, and a second EGR valve for adjusting the flow rate of the EGR gas flowing in the second EGR passage, and when the NO$_x$ reduction controlling module performs the NO$_x$ reduction control, the EGR controlling module fully closes the first EGR valve and sets the opening of the second EGR valve to the target opening so as to recirculate the EGR gas by only passing through the second EGR passage.

2. The system of claim 1, wherein the NO$_x$ reduction controlling module starts the NO$_x$ reduction control after the opening of the EGR valve is controlled to the target opening and EGR gas is supplied into the engine at a flow rate corresponding to the target opening.

3. The system of claim 2, wherein the NO$_x$ reduction controlling module estimates an in-cylinder oxygen concentration based on an operating state of the engine, determines that the EGR gas is supplied into the engine at the flow rate corresponding to the target opening when a difference between the estimated in-cylinder oxygen concentration and a target in-cylinder oxygen concentration for the $NO_x$ reduction control falls below a given value, and starts the $NO_x$ reduction control.

4. The system of claim 1, wherein the EGR controlling module sets the target opening based on a target in-cylinder oxygen concentration for the $NO_x$ reduction control.

5. The system of claim 1, wherein when the $NO_x$ stored amount in the $NO_x$ catalyst exceeds a given determination amount, the $NO_x$ reduction controlling module executes, as the $NO_x$ reduction control, a first $NO_x$ reduction control in which the fuel injector performs the post injection to continuously control the air-fuel ratio to the target air-fuel ratio so that the stored $NO_x$ is reduced and the $NO_x$ stored amount falls below a given amount, the post injection being performed at a timing so that the injected fuel is combusted inside a cylinder of the engine.

6. An exhaust emission control system of an engine, including a $NO_x$ catalyst disposed in an exhaust passage of the engine for storing $NO_x$ within exhaust gas when an air-fuel ratio of the exhaust gas is lean, and reducing the stored $NO_x$ when the air-fuel ratio is stoichiometric or rich, the exhaust emission control system comprising a processor configured to execute:
  a $NO_x$ reduction controlling module for performing a $NO_x$ reduction control in which a fuel injector performs a post injection of fuel to control the air-fuel ratio to a target air-fuel ratio so that the stored $NO_x$ is reduced, the target air-fuel ratio being a ratio at which the stored $NO_x$ is reducible; and
  an exhaust gas recirculation (EGR) controlling module for controlling an EGR valve disposed in an EGR passage connected to the exhaust passage and an intake passage of the engine, to recirculate EGR gas from the exhaust passage to the intake passage at a flow rate according to an operating state of the engine, wherein
  when the $NO_x$ reduction controlling module performs the $NO_x$ reduction control, the EGR controlling module controls an opening of the EGR valve to a target opening smaller than the opening when the $NO_x$ reduction controlling module does not perform the $NO_x$ reduction control in the same operating state of the engine,
  the $NO_x$ reduction controlling module starts the $NO_x$ reduction control after the opening of the EGR valve is controlled to the target opening,
  when the $NO_x$ stored amount in the $NO_x$ catalyst exceeds a given determination amount, the $NO_x$ reduction controlling module executes, as the $NO_x$ reduction control, a first $NO_x$ reduction control in which the fuel injector performs the post injection to continuously control the air-fuel ratio to the target air-fuel ratio so that the stored $NO_x$ is reduced and the $NO_x$ stored amount falls below a given amount, the post injection being performed at a timing so that the injected fuel is combusted inside a cylinder of the engine,
  when the $NO_x$ stored amount in the $NO_x$ catalyst is below the determination amount and the air-fuel ratio becomes rich due to acceleration of a vehicle, the $NO_x$ reduction controlling module also performs a second $NO_x$ reduction control in which the fuel injector performs the post injection so as to temporarily control the air-fuel ratio to the target air-fuel ratio, so that the $NO_x$ stored in the $NO_x$ catalyst is reduced, the post injection being performed at a timing so that the injected fuel is discharged as unburned fuel without being combusted inside the cylinder, and
  when the $NO_x$ reduction controlling module performs the second $NO_x$ reduction control, the EGR controlling module limits the recirculation of EGR gas to be less than when the $NO_x$ reduction controlling module performs the first $NO_x$ reduction control.

7. The system of claim 6, wherein the EGR controlling module prohibits the recirculation of EGR gas when the $NO_x$ reduction controlling module performs the second $NO_x$ reduction control.

* * * * *